US009900846B2

(12) United States Patent
Kawagishi et al.

(10) Patent No.: US 9,900,846 B2
(45) Date of Patent: Feb. 20, 2018

(54) INFORMATION PROCESSING APPARATUS, INFORMATION TERMINAL, AND INFORMATION PROCESSING METHOD

(71) Applicant: MITSUBISHI ELECTRIC CORPORATION, Tokyo (JP)

(72) Inventors: Toshio Kawagishi, Tokyo (JP); Jun Katada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 159 days.

(21) Appl. No.: 15/031,421

(22) PCT Filed: Dec. 27, 2013

(86) PCT No.: PCT/JP2013/085064
§ 371 (c)(1),
(2) Date: Apr. 22, 2016

(87) PCT Pub. No.: WO2015/097848
PCT Pub. Date: Jul. 2, 2015

(65) Prior Publication Data
US 2016/0270002 A1 Sep. 15, 2016

(51) Int. Cl.
*H04W 52/22* (2009.01)
*H04W 4/00* (2009.01)
(Continued)

(52) U.S. Cl.
CPC ............ *H04W 52/22* (2013.01); *H04L 43/16* (2013.01); *H04M 1/7253* (2013.01);
(Continued)

(58) Field of Classification Search
None
See application file for complete search history.

(56) References Cited

U.S. PATENT DOCUMENTS

2008/0165984 A1\* 7/2008 Yun ..................... H04M 1/6091
381/86
2010/0201567 A1\* 8/2010 Lydon .................... H04W 8/24
342/357.22
(Continued)

FOREIGN PATENT DOCUMENTS

JP 10-135893 A 5/1998
JP 2002-218540 A 8/2002
(Continued)

*Primary Examiner* — Candal Elpenord
(74) *Attorney, Agent, or Firm* — Birch, Stewart, Kolasch & Birch, LLP

(57) ABSTRACT

A communication manager acquires, through a communication controller, a voluntary notification given by a mobile device. The communication manager issues automatically, to the mobile device, an information acquisition command as a response to the voluntary notification when the voluntary notification indicates that a single-call state is formed by the mobile device, to thereby acquire information on communication between the mobile device and the phone communication party. The communication manager issues automatically and intermittently, to the mobile device, the information acquisition command when the voluntary notification indicates that the state of the mobile device is changed into a multiple-call state, to thereby acquire intermittently information on communication between the mobile device and the phone communication parties.

7 Claims, 16 Drawing Sheets

(51) Int. Cl.
*H04L 12/26* (2006.01)
*H04M 1/725* (2006.01)
*H04M 19/04* (2006.01)
*H04M 1/60* (2006.01)

(52) U.S. Cl.
CPC ........... *H04M 19/04* (2013.01); *H04W 4/008* (2013.01); *H04M 1/6091* (2013.01)

(56) References Cited

U.S. PATENT DOCUMENTS

| | | | | |
|---|---|---|---|---|
| 2011/0251705 A1* | 10/2011 | Takizawa | ............ | H04M 1/7253 700/94 |
| 2012/0071140 A1* | 3/2012 | Oesterling | ............ | H04W 4/046 455/414.1 |
| 2012/0196583 A1* | 8/2012 | Kindo | ................. | H04M 1/6091 455/415 |
| 2013/0005319 A1* | 1/2013 | Sakata | .................... | B60R 25/00 455/418 |

FOREIGN PATENT DOCUMENTS

| | | | |
|---|---|---|---|
| JP | 2004-164566 A | 6/2004 |
| JP | 2007-96838 A | 4/2007 |
| JP | 2007-124517 A | 5/2007 |
| JP | 2008-42443 A | 2/2008 |
| JP | 2009-275427 A | 11/2009 |
| JP | 2013-17244 A | 1/2013 |
| WO | WO 2011/043072 A1 | 4/2011 |

* cited by examiner

F I G . 1 8
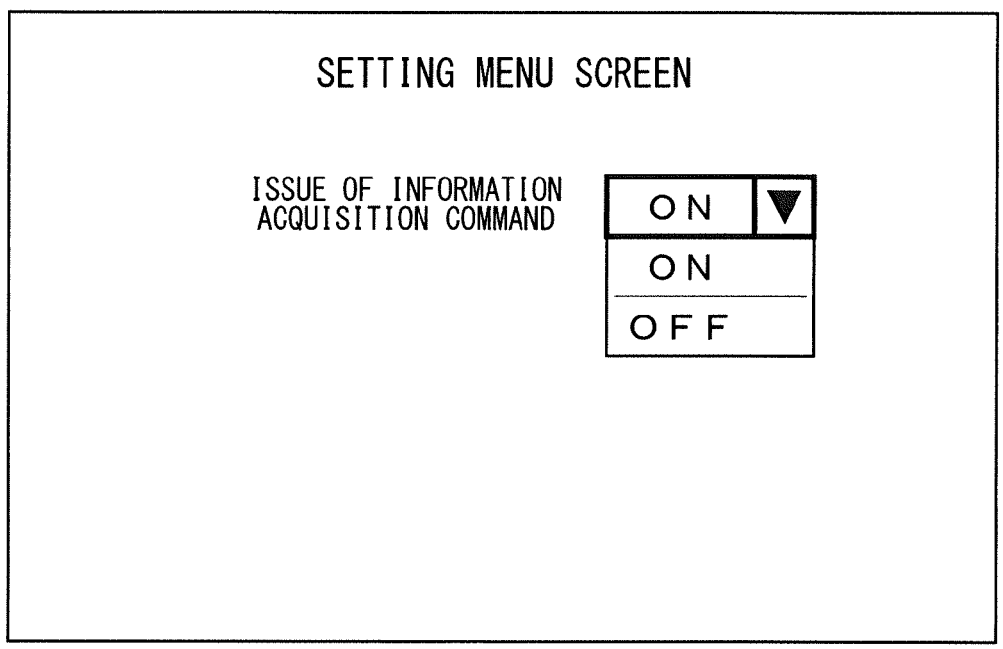

INFORMATION PROCESSING APPARATUS, INFORMATION TERMINAL, AND INFORMATION PROCESSING METHOD

TECHNICAL FIELD

The present invention relates to an information processing apparatus, an information terminal, and an information processing method.

BACKGROUND ART

By using a short-range communication such as Bluetooth (registered trademark) or the like, in cooperation between a mobile phone carried in a car and an in-vehicle information terminal, a hands-free call can be achieved. Further, it is well known that the in-vehicle information terminal has a function of acquiring a telephone number of an opposite party and a communication state (during talk, hold, or the like) from the mobile phone and displaying these information on a screen of the in-vehicle information terminal.

As information acquisition by the in-vehicle information terminal, for example, the mobile phone voluntarily notifies predetermined information. Further, the in-vehicle information terminal issues a command that requests transmission of information, and the mobile phone transmits the requested information in response to the command.

PRIOR-ART DOCUMENTS

Patent Documents

[Patent Document 1] Japanese Patent Application Laid-Open No. 10-135893
[Patent Document 2] Japanese Patent Application Laid-Open No. 2004-164566
[Patent Document 3] Japanese Patent Application Laid-Open No. 2007-124517
[Patent Document 4] Japanese Patent Application Laid-Open No. 2009-275427

SUMMARY OF INVENTION

Problems to be Solved by the Invention

There is a case, for example, where the mobile phone cannot appropriately perform the above voluntary notification due to a problem of standard for communication between the mobile phone and the in-vehicle information terminal. As the problem of communication standard, for example, there is a trouble of the communication standard itself. Further, it can be thought that compatibility is not ensured because the version of communication standard of the mobile phone and that of the in-vehicle information terminal are different. Moreover, any information which is not determined to be voluntarily notified in the communication standard is not naturally notified voluntarily from the mobile phone.

Even in these cases, if the in-vehicle information terminal issues a command for information acquisition, the in-vehicle information terminal can acquire various information. In consideration of this fact, it is thought that the information acquisition by issue of command is very useful.

Further, if the command for information acquisition is periodically issued, it is possible to acquire a change of the communication state of the mobile phone or the like at the appropriate times. As the issue interval of the command decreases, it becomes more effective. As a result, it becomes possible to manage the communication of the mobile phone by using reliable information. Further, it also becomes possible to provide a user with reliable information.

The mobile phone consumes power, however, for the operation in response to the information acquisition command. For this reason, frequent issues of the information acquisition commands cause quick consumption of battery power of the mobile phone which is driven by a battery.

In order to make the battery power last longer, it is preferable to perform less issues of the information acquisition command. Further, when the issue of the information acquisition command is avoided and only the information which is voluntarily notified from the mobile phone is displayed, it is possible to prevent battery consumption due to the issue of the information acquisition command. In these cases, however, the reliability of the information decreases in communication management of the mobile phone.

Thus, it is thought that suppressing the battery consumption of the mobile phone is contradictory to suppressing a decrease in reliability of information on the communication of the mobile phone.

Further, such a problem is not limited to the above case. The same problem can arise in a case where the mobile phone and the in-vehicle information terminal are connected to each other via wired communication. Furthermore, the same applies to various mobile devices other than the mobile phone. The same also applies to a case where the information terminal is not fixed to the car.

It is an object of the present invention to provide a technique for suppressing consumption of a battery of a mobile device (a mobile phone is described above as an example) and suppressing a decrease in reliability of information on communication of the mobile device.

Means for Solving the Problems

According to an aspect of the present invention, an information processing apparatus includes a communication controller, a communication manager, and a display controller. The communication controller controls communication with a mobile device. The mobile device can be driven by a battery and has a function of phone communication with another device. The communication manager acquires, through the communication controller, a voluntary notification given by the mobile device. The communication manager issues automatically, to the mobile device, an information acquisition command as a response to the voluntary notification when the voluntary notification indicates that a single-call state is formed by the mobile device, to thereby acquire information on communication between the mobile device and the phone communication party. The communication manager issues automatically and intermittently, to the mobile device, the information acquisition command when the voluntary notification indicates that the state of the mobile device is changed into a multiple-call state, to thereby acquire intermittently information on communication between the mobile device and the phone communication parties. The display controller causes a display apparatus to display information to be displayed, among communication management information acquired by the voluntary notification and the information acquisition command.

Effects of the Invention

According to the aspect of the present invention, it is possible to suppress issue of the information acquisition command. Therefore, it is also possible to suppress consumption of a battery of the mobile device. As well as this effect, it is possible to suppress a decrease in reliability of the communication management information, as compared with the case of depending only on a voluntary notification from the mobile device.

These and other objects, features, aspects and advantages of the present invention will become more apparent from the following detailed description of the present invention when taken in conjunction with the accompanying drawings.

BRIEF DESCRIPTION OF DRAWINGS

FIG. 18 is a view showing a screen example of the information terminal in accordance with a sixth preferred embodiment.

DESCRIPTION OF EMBODIMENT(S)

The First Preferred Embodiment

Figure 1:
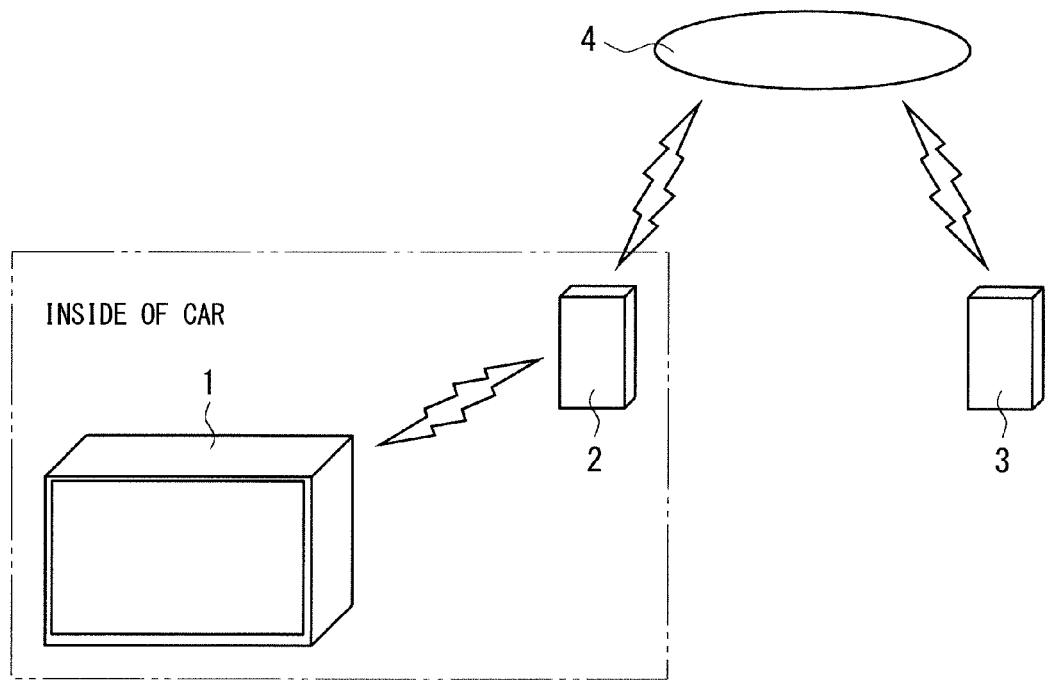
FIG. 1 is a view showing an exemplary use of an information terminal in accordance with a first preferred embodiment.

FIG. 1 is a view showing an exemplary use of an information terminal apparatus 1 in accordance with the first preferred embodiment. The information terminal apparatus 1 is sometimes referred to as an information terminal 1 or a terminal 1. Hereinafter, an exemplary case where the information terminal 1 is arranged inside a car will be described, and therefore the information terminal 1 is sometimes referred to as an in-vehicle information terminal 1 or an in-vehicle terminal 1.

The information terminal 1 is implemented, for example, with a so-called head unit provided on a side of a driver's seat. In general, the head unit is a unit for controlling output of a video image and music, execution of a navigation function, various operations, and the like.

The information terminal 1 has a function of performing communication with a mobile device 2 which is present in the car where the information terminal 1 is arranged. Herein, shown is a case where the communication between the information terminal 1 and the mobile device 2 is achieved with Bluetooth (registered trademark) which is an example of short-range wireless communication. Other communication standards, however, can be used. Further, wired communication can be also used.

The mobile device 2 has a function of performing communication with another device 3 other than the information terminal 1, as well as the function of performing communication with the information terminal 1. Though the mobile device 2 is connected to the device 3 through a communication network 4 in the exemplary case of FIG. 1, these devices 2 and 3 may be connected to each other not through the communication network 4. Further, though the device 3 is present outside the car in the exemplary case of FIG. 1, the device 3 may be present inside the car.

Herein, shown is a case where the mobile device 2 and another device 3 each have a phone function and the communication between the devices 2 and 3 is used for phone communication. The device 3 is sometimes referred to as an opposite-party device 3, a communication party 3, a phone communication party 3, or an opposite party 3.

Further, shown is a situation where the mobile device 2 is a battery-powered one and the mobile device 2 is operated by a battery. In this case, the mobile device 2 is, for example, a mobile phone, a smartphone, or the like which is carried in the car. The mobile device 2 may be driven by an external power supply (an in-vehicle power supply, a commercial power supply, or the like) as well as a battery.

On the other hand, the opposite-party device 3 may be, for example, either a mobile phone or a fixed-line phone. A power supply for the opposite-party device 3 is not limited to a specific kind.

Figure 2:
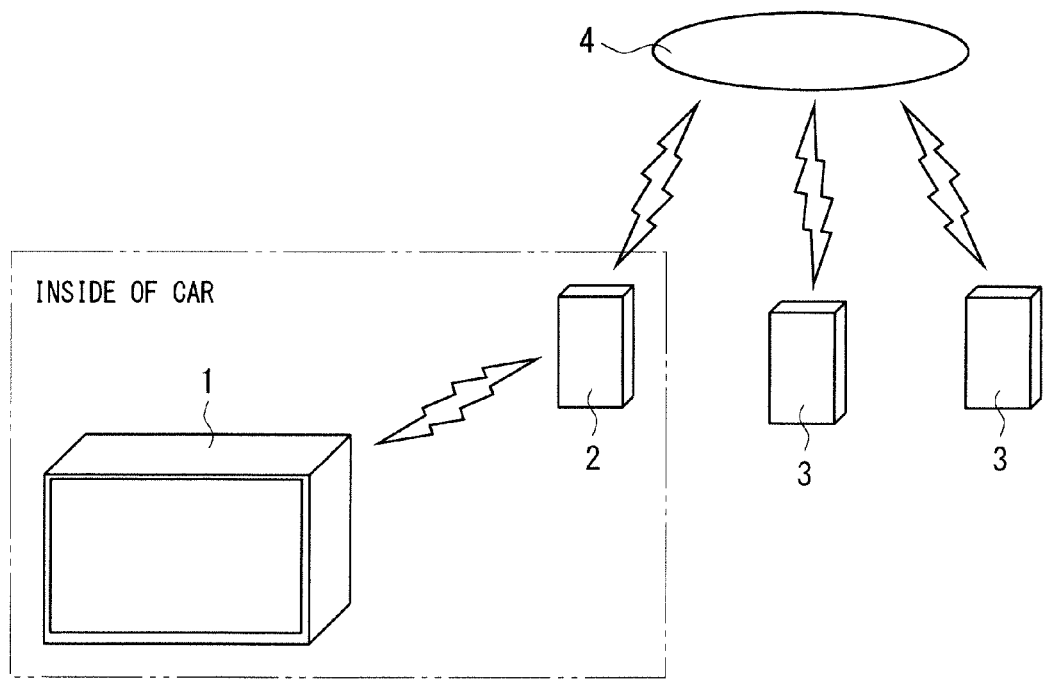
FIG. 2 is a view showing a state where a mobile device is connected to a plurality of opposite-party devices in accordance with the first preferred embodiment.

As shown in FIG. 2, depending on the specification of the mobile device 2 or the like, the mobile device 2 can be simultaneously connected to a plurality of opposite-party devices 3 (in other words, multiple calls). The number of opposite-party devices 3, however, is not limited to the number shown in FIG. 2. A state where the mobile device 2 is simultaneously connected to a plurality of opposite-party devices 3 is sometimes referred to as a multiple-party state or a multiple-call state. A phone communication with a plurality of parties is sometimes referred to as, for example, a multiparty call, a multicall, a conference call, or a group call.

The multiple-party state is formed, for example, when the mobile device 2 sequentially dials a plurality of phone communication parties 3. Further, the multiple-party state is formed also when an interrupt call arrives at the mobile device 2 during talk. There is a case where the mobile device 2 forms a phone talk state simultaneously with all the calls, or there is another case where the mobile device 2 forms a phone talk state with some calls and forms a hold state with the other calls.

As described above, the information terminal 1 is connected to the mobile device 2 via Bluetooth (registered trademark). In this case, by using HEP (Hands-Free Profile) of the Bluetooth (registered trademark) or the like, provided is an environment for hands-free call.

Figure 3:
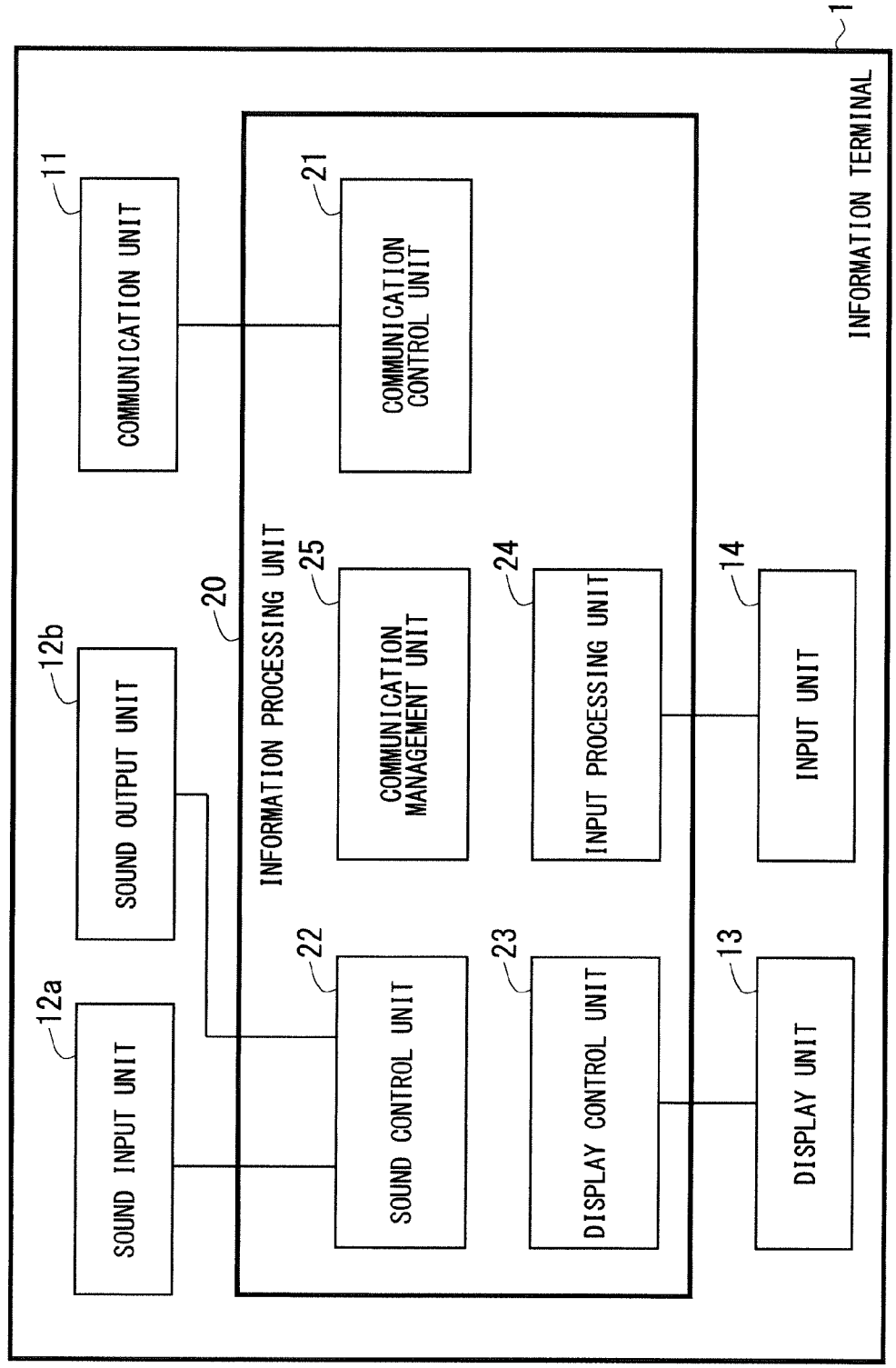
FIG. 3 is a block diagram showing an exemplary constitution of the information terminal in accordance with the first preferred embodiment.

FIG. 3 shows a block diagram of an exemplary constitution of the information terminal 1. As shown in the exemplary case of FIG. 3, the information terminal 1 includes a communication unit 11, a sound input unit 12a, a sound output unit 12b, a display unit 13, an input unit 14, and an information processing unit 20. Further, as shown in the exemplary case of FIG. 3, the information processing unit 20 includes a communication control unit 21, a sound control unit 22, a display control unit 23, an input processing unit 24, and a communication management unit 25.

The communication unit 11 is implemented with a communication circuit for performing communication with the mobile device 2. Herein, shown is a wireless communication circuit in conformity to the Bluetooth (registered trademark). The communication unit 11 generates a transmission signal in response to an instruction from the communication control unit 21 and transmits the transmission signal to the outside of the information terminal 1. Further, the communication unit 11 receives a signal which arrives from the outside of the information terminal 1 and passes information included in the received signal to the communication control unit 21.

The sound input unit 12a is formed of, for example, a microphone or the like. The sound input unit 12a may include a plurality of microphones. The sound input unit 12a converts collected sound into a signal which can be processed by the sound control unit 22 and supplies the signal to the sound control unit 22.

The sound output unit 12b is formed of for example, a speaker, an audio amplifier, and the like. The sound output unit 12b may include a plurality of speakers. The sound output unit 12b outputs sound data which is supplied by the sound control unit 22, as sound which a user can sense. Specifically, the sound data is converted into an analog electrical signal by the audio amplifier and outputted as sound from the speaker.

In cooperation between the sound control unit 22 and the communication control unit 21, for example, a phone communication using the sound input unit 12a and the sound output unit 12b can be achieved. Specifically, a voice of the user is sent to the opposite-party device 3 through the sound input unit 12a, the sound control unit 22, the communication control unit 21, and the mobile device 2. Voice data transmitted from the opposite-party device 3 to the mobile device 2 is passed to the sound output unit 12b through the communication unit 11, the communication control unit 21, and the sound control unit 22, and outputted from the sound output unit 12b.

Further, the sound input unit 12a, the sound output unit 12b, and the sound control unit 22 may be used for a use other than the phone communication.

The display unit 13 is formed of, for example, a liquid crystal display. The display unit 13 may include a plurality of liquid crystal displays. Further, the display unit 13 can be formed of other type of display apparatus. The display unit 13 performs a display operation on the basis of image data supplied from the display control unit 23. In other words, the display control unit 23 generates the image data to be displayed on the display unit 13 and supplies the display unit 13 with the image data.

The input unit 14 receives an input operation of the user and passes the input operation to the input processing unit 24 as a signal which can be processed by the input processing unit 24. The input unit 14 is formed of, for example, a touch panel. It is assumed herein that a touch panel is piled on a screen of the display unit 13. The arrangement of the touch panel, however, is not limited to this exemplary case.

The input processing unit 24 controls various functions in accordance with an input content. For example, the input processing unit 24 acquires a motion of a finger of the user on the touch panel, from the touch panel, and analyzes which part of the screen the finger operates. When an analysis result that the user performs an operation on an icon for volume control, to increase the volume, is obtained, the input processing unit 24 notifies the sound control unit 22 of the analysis result.

The input unit 14 may include a mouse, a keyboard, a switch, and the like, instead of or as well as the touch panel.

The communication management unit 25 manages the communication between the mobile device 2 and the opposite-party device 3. For example, the communication management unit 25 acquires information on the communication between the mobile device 2 and the opposite-party device 3, as communication management information, through the communication control unit 21 and the communication unit 11. Further, the communication management unit 25 performs various controls on the basis of the communication management information.

The communication management information is roughly classified into the information which is voluntarily notified by the mobile device 2 and the information which is transmitted from the mobile device 2 in response to the request by the communication management unit 25.

As the communication management information which is voluntarily notified by the mobile device 2, shown is information on the communication state between the mobile device 2 and the opposite-party device 3. With such a communication state notification, for example, a call state is notified. The call state indicates, for example, various states such as during outgoing call, during calling, during talk, during hold, end of talk, and the like. At a timing of changing the call state, the mobile device 2 notifies the call state after the change.

Which call state is to be notified depends on the specification of the mobile device 2. For example, the notification of hold state is an option in the standard of the Bluetooth (registered trademark). For this reason, the mobile device 2 which adopts the notification of hold state voluntarily notifies that it is in a hold state.

Further, as another example of communication state notification, there is a notification that it is brought into a multiple-party state (in other words, a state where the mobile device 2 communicates with a plurality of opposite-party devices 3). The notification is transmitted from the mobile device 2 at a timing of forming the multiple-party state.

The standard of the Bluetooth (registered trademark) does not adopt a notification that it is brought back into a state where the mobile device 2 communicates with a single opposite-party device 3. Further, in the multiple-party state, the call state for each opposite-party device 3 is not notified.

On the other hand, when the mobile device 2 transmits the information in response to the request from the communication management unit 25, the communication management unit 25 issues a command that requests transmission of the information. The command is sometimes referred to as an information acquisition command or an information transmission request command. The information acquisition command is transmitted to the mobile device 2 through the communication control unit 21 and the communication unit 11.

As the communication management information which can be acquired by the information acquisition command, shown is a telephone number of the opposite-party device 3. Further, information such as a direction in which the communication occurs, the types of voice call, data call and FAX, the types of intracountry call and international call, or the like can be also acquired by the information acquisition command.

Furthermore, the communication management information which is voluntarily notified by the mobile device 2 can be also acquired by the information acquisition command.

Some or all of the information acquired by the communication state notification and the information acquisition command are displayed on the display unit 13. Specifically, the information to be displayed is passed from the communication management unit 25 to the display control unit 23 and displayed on the display unit 13 under the control of the display control unit 23. As the information to be displayed, for example, shown is the telephone number of the opposite-party device 3. The information to be displayed may be specified by the user.

Herein, the information processing unit 20 is an apparatus for performing various processings in the information terminal 1. Therefore, the information processing unit 20 may be referred to as an information processing apparatus 20. The information processing unit 20 can be formed of, for example, a processor unit and a storage unit. More specifically, the processor unit is formed of one or more processor circuits. The storage unit is formed of one or more memory units such as a ROM, a RAM, a rewritable and non-volatile semiconductor memory, a hard disk unit, or the like.

In this exemplary case, when the processor unit executes various programs stored in the storage unit, various processings are performed. The processings may be performed concurrently. By performing various processings, corresponding various functions (for example, respective functions of the communication control unit 21, the sound control unit 22, the display control unit 23, the input processing unit 24, and the communication management unit 25) are implemented.

The storage unit is also used to store various information (for example, the communication management information), as well as various programs. Further, the storage unit provides a work area for the processor unit to execute the programs. The storage unit also provides an image holding unit into which an image to be displayed on the display unit 13 is written. The image holding unit is sometimes referred to as a video memory or a graphic memory.

Though various functions of the information processing unit 20 are implemented by software herein, some or all of these functions may be implemented by hardware (for example, an arithmetic circuit configured to perform a specific computation, or the like).

Figure 4:
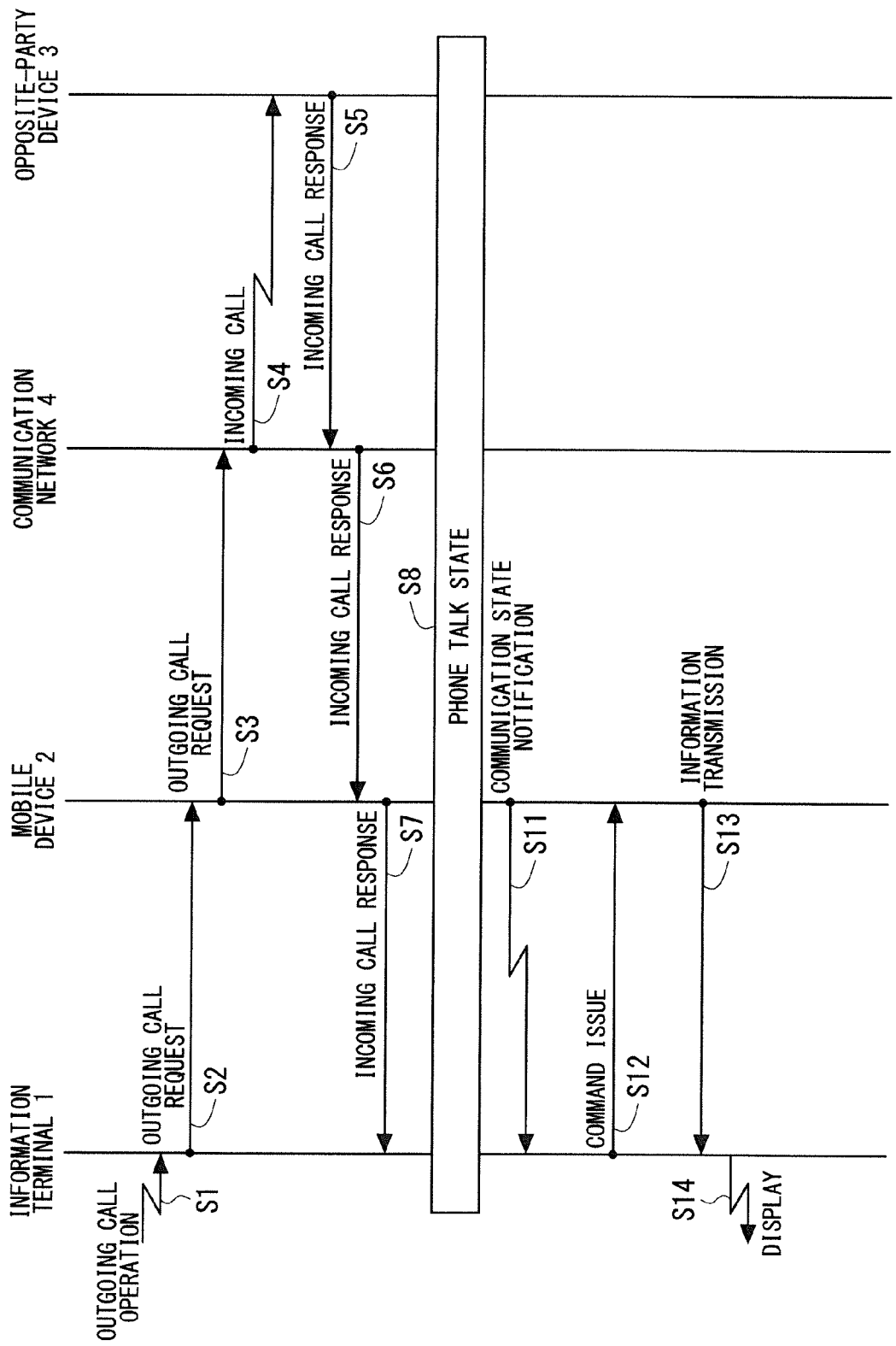
FIG. 4 is a sequence diagram showing an exemplary operation of the information terminal in accordance with the first preferred embodiment.

FIG. 4 shows a sequence diagram of an exemplary operation of the information terminal 1. As shown in FIG. 4, first, in the following Steps S1 to S7, the information terminal 1 gets connected to the opposite-party device 3 through the mobile device 2 and the communication network 4, to thereby form a state S8 of enabling a phone talk. The state S8 is sometimes referred to as a phone talk state S8.

When the user performs an outgoing call operation on the information terminal 1 (Step S1), the information terminal 1 transmits an outgoing call request to the mobile device 2 (Step S2). When the mobile device 2 receives the outgoing call request, the mobile device 2 dials a telephone number which is specified by the outgoing call request, by using its own phone function. With this operation, the outgoing call request is transmitted from the mobile device 2 to the communication network 4 (Step S3). When the communication network 4 receives the outgoing call request, the communication network 4 notifies an incoming call to the opposite-party device 3 to which the telephone number specified by the outgoing call request is assigned (Step S4). When the opposite-party device 3 transmits an incoming call response to the communication network 4 (Step S5), the communication network 4 transmits the incoming call response to the mobile device 2 (Step S6) and the mobile device 2 transmits the incoming call response to the information terminal 1 (Step S7). Thus, formed is the phone talk state S8.

After the phone talk state S8 is formed, the mobile device 2 transmits the communication state notification indicating that the phone talk state S8 is formed to the information terminal 1 (Step S11). The incoming call response in the above Step S7 may be handled as the communication state notification in Step S11.

With receipt of the communication state notification, the information terminal 1 issues the information acquisition command to the mobile device 2 (Step S12). When the mobile device 2 receives the information acquisition command, the mobile device 2 transmits the communication management information which is specified by the information acquisition command to the information terminal 1 (Step S13).

The information terminal 1 displays the information which is specified to be displayed, among the communication management information acquired from the mobile device 2, on the display unit 13 (Step S14).

After that, the information terminal 1 stops the issue of the information acquisition command until the next communication state notification is received. As the communication state notification received next, for example, a notification indicating that the communication between the mobile device 2 and the opposite-party device 3 is held is assumed. Further, when the state is returned from the hold state to the phone talk state, a notification indicating the phone talk state is assumed. Furthermore, a communication state notification indicating that the state is brought into the multiple-party state is assumed. Moreover, a notification indicating the end of communication between the mobile device 2 and the opposite-party device 3 is assumed.

Figure 5:
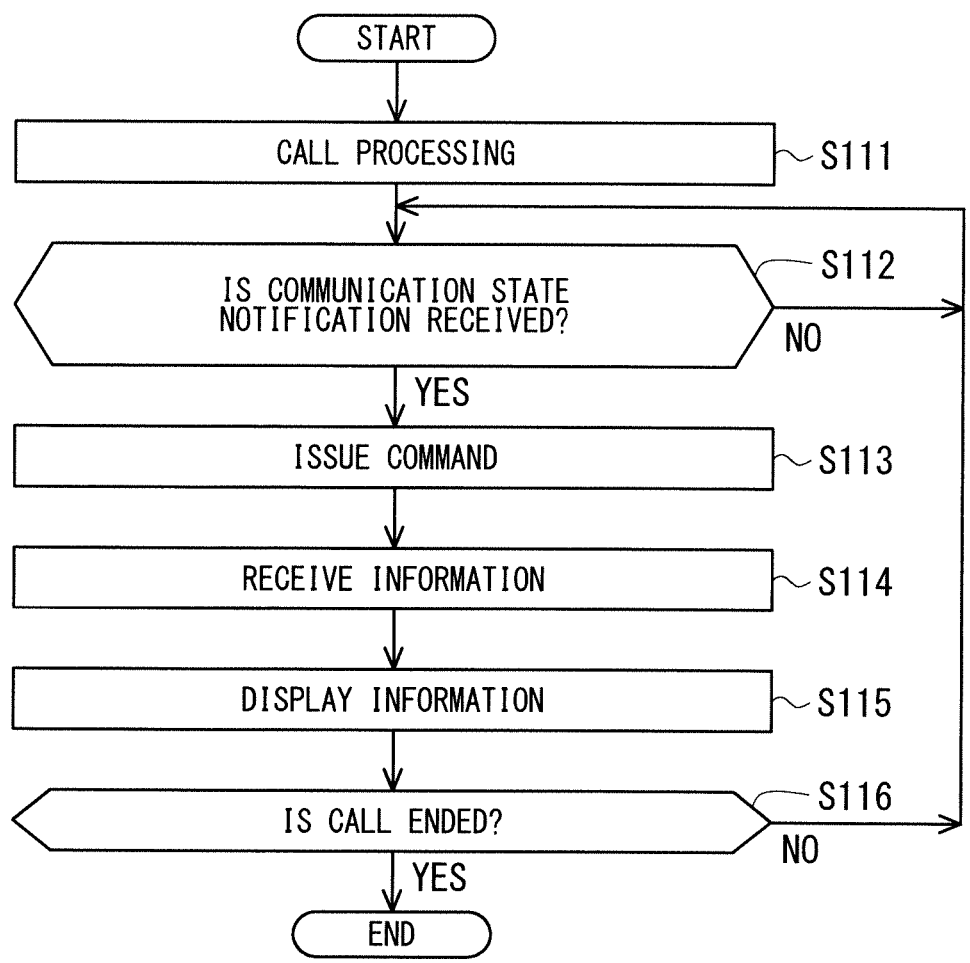
FIG. 5 is a flowchart showing the exemplary operation of the information terminal in accordance with the first preferred embodiment.

FIG. 5 shows a flowchart of the exemplary operation of the information terminal 1. As shown in the exemplary flow of FIG. 5, first, a call processing is performed under the control of the communication management unit 25 (Step S111). In the call processing, Steps S1 and S2 and the like described with reference to FIG. 4 are performed. After the call processing, the information terminal 1 performs the next Steps S112 to S116 while providing the environment for hands-free call.

Specifically, after Step S111, the information terminal 1 comes into a reception waiting state for the communication state notification (Step S112). Then, when the information terminal 1 receives the communication state notification, the information terminal 1 issues the information acquisition command (Step S113), Step S113 corresponds to Step S12 described with reference to FIG. 4.

Then, the information terminal 1 receives the information transmitted from the mobile device 2 as a response to the information acquisition command (Step S114). The information terminal 1 displays the information to be displayed, among the information acquired from the mobile device 2, on the display unit 13 (Step S115). Step S115 corresponds to Step S14 described with reference to FIG. 4.

After that, the communication management unit 25 in the information terminal 1 determines whether or not the communication state notification received in the above Step S112 indicates the end of the communication (in other words, the call) between the mobile device 2 and the opposite-party device 3 (Step S116). When it is determined that the call continues, the information terminal 1 returns the process step to Step S112. On the other hand, when it is determined that the call is ended, the information terminal 1 finishes the flow of FIG. 5.

According to the first preferred embodiment, the issue of the information acquisition command is suppressed, as compared with the case where the periodic issue of the information acquisition command is always performed. Therefore, it is possible to suppress the consumption of the battery of the mobile device 2. As well as this effect, it is also possible to suppress a decrease in reliability of the communication management information, as compared with the case of depending only on the voluntary notification from the mobile device 2.

In a case where the mobile device 2 has a constitution which corresponds to the sound input unit 12a and the sound output unit 12b in the information terminal 1, the constitution may be used. In this exemplary case, it is possible to omit the sound input unit 12a, the sound output unit 12b and the sound control unit 22 from the information terminal 1. Similarly, in a case where the mobile device 2 has a constitution which corresponds to the input unit 14 and the display unit 13 in the information terminal 1, the constitution may be used. In this exemplary case, it is possible to omit the input unit 14, the input processing unit 24 and the display unit 13 from the information terminal 1.

Figure 6:
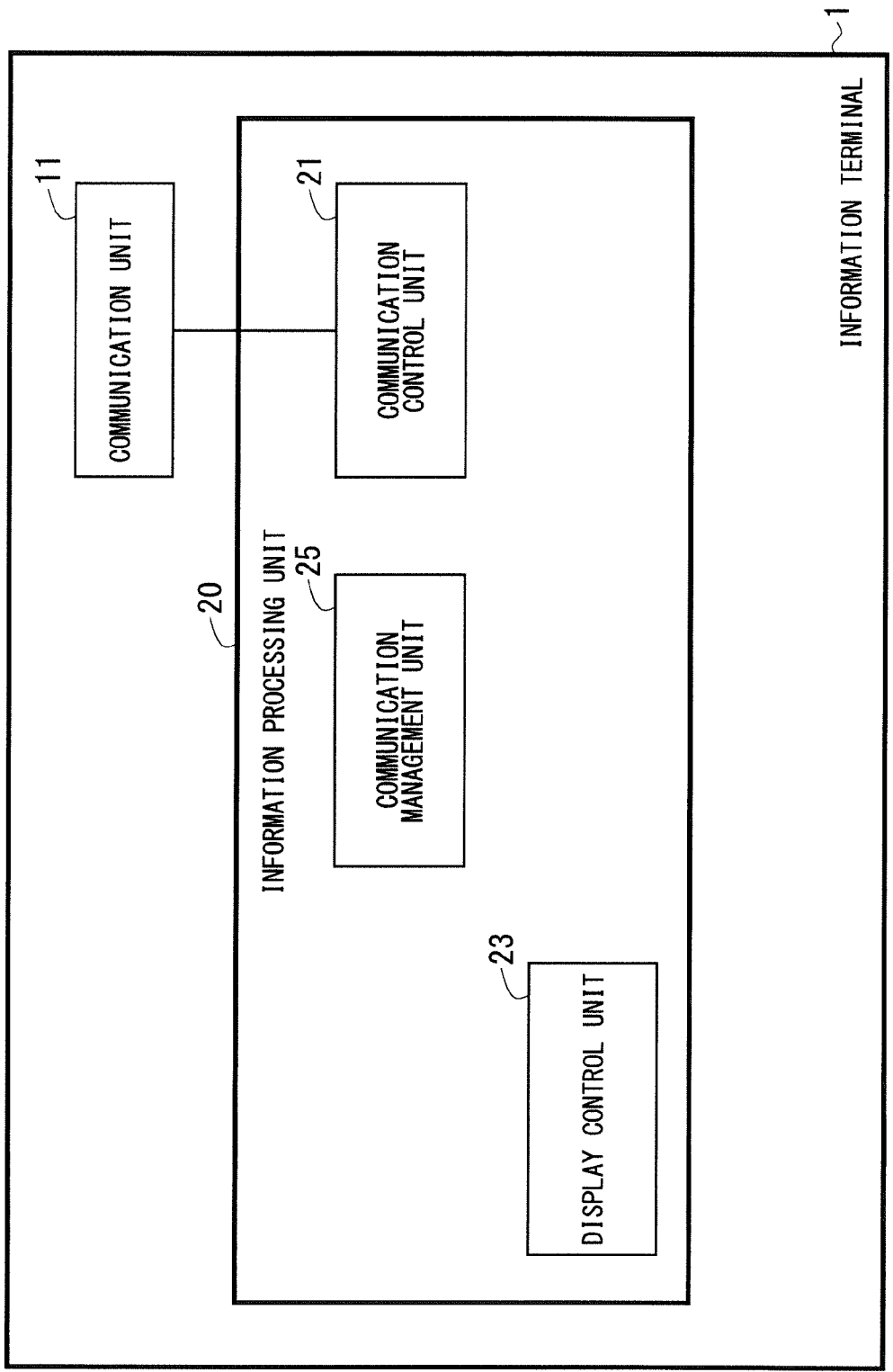
FIG. 6 is a block diagram showing another exemplary constitution of the information terminal in accordance with the first preferred embodiment.

In consideration of these cases, an exemplary constitution shown in FIG. 6 is thought to be possible. In the exemplary case of FIG. 6, the information inputted from the input unit of the mobile device 2 is transferred to the communication management unit 25 through the communication unit 11 and the communication control unit 21. Further, the image data generated by the display control unit 23 is transmitted to the mobile device 2 through the communication control unit 21 and the communication unit 11, and displayed on the display unit of the mobile device 2.

Furthermore, the exemplary constitution of FIG. 6 can be applied to an input apparatus or the like provided separately from the information terminal 1 and the mobile device 2. As necessary, the communication unit 11 and the communication control unit 21 may be changed so as to conform to the communication standard of such an input apparatus or the like.

The Second Preferred Embodiment

Hereinafter, the second preferred embodiment will be described as to the issue of the information acquisition command. The constitution of the information terminal 1 and the information processing unit 20 is the same as that in the first preferred embodiment.

Figure 7:
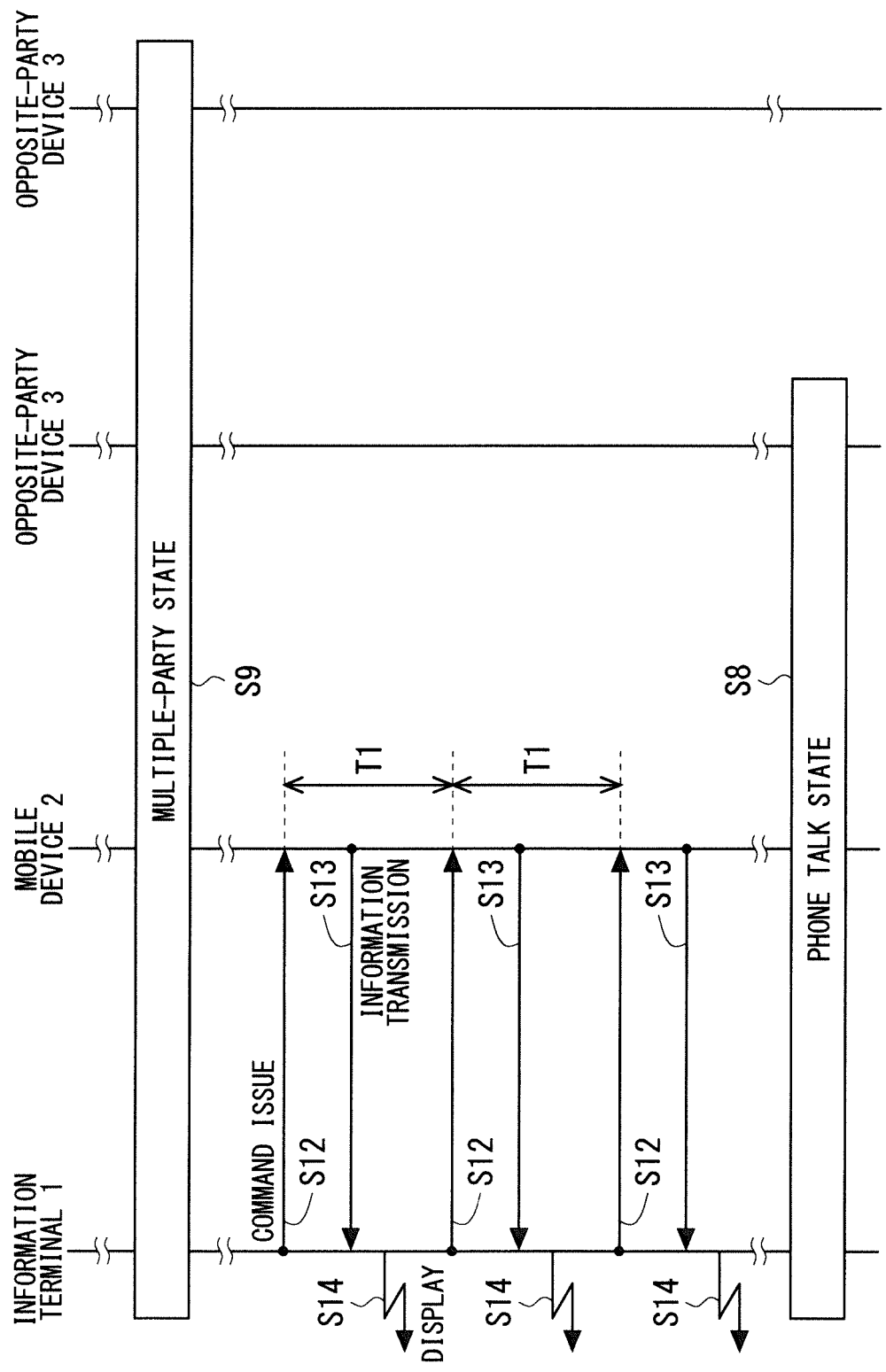
FIG. 7 is a sequence diagram showing an exemplary operation of the information terminal in accordance with a second preferred embodiment.

FIG. 7 shows a sequence diagram in accordance with the second preferred embodiment. In FIG. 7, due to the short of drawing space, the communication network 4 (see FIG. 4) is not shown. As shown in FIG. 7, the information terminal 1 issues the information acquisition command intermittently (in other words, continuously with intervals) in the multiple-party state S9.

In the second preferred embodiment, the issue interval (in other words, the issue period) T1 of the information acquisition command is assumed to be a predetermined constant value. In this exemplary case, the information acquisition command is issued periodically. The issue interval of the information acquisition command is sometimes referred to as a command issue interval.

It is assumed that the first information acquisition command in the multiple-party state S9 is issued at a timing of receiving the communication state notification indicating that the state is brought into the multiple-party state S9, like in the first preferred embodiment. Further, when there is one opposite-party device 3, it is assumed that the information acquisition command is issued in the same manner as in the first preferred embodiment. The present preferred embodiment, however, is not limited to these cases.

As described in the first preferred embodiment, in the standard of the Bluetooth (registered trademark), the call state for each opposite-party device 3 is not voluntarily notified in the multiple-party state S9. According to the second preferred embodiment, however, the call state for each opposite-party device 3 which is comprehended by the mobile device 2 can be acquired by the information acquisition command. Further, the communication management information (telephone number or the like) for each opposite-party device 3 other than the call state can be also acquired by the information acquisition command.

Further, as described in the first preferred embodiment, the standard of the Bluetooth (registered trademark) does not adopt a voluntary notification that it is brought back into a state where the mobile device 2 communicates with a single opposite-party device 3. According to the second preferred embodiment, however, the information terminal 1 (more specifically, the communication management unit 25) can comprehend the call state for each opposite-party device 3 as described above. In other words, the communication management unit 25 can comprehend the number of opposite-party devices 3 with which the communication of the mobile device 2 is held (for example, during talk state or during hold state). With this, the communication management unit 25 can determine that the state is brought back into a state where a single opposite-party device 3 is connected. Further, the communication management unit 25 can determine that the communications with all the opposite-party devices 3 are ended.

Figure 8:
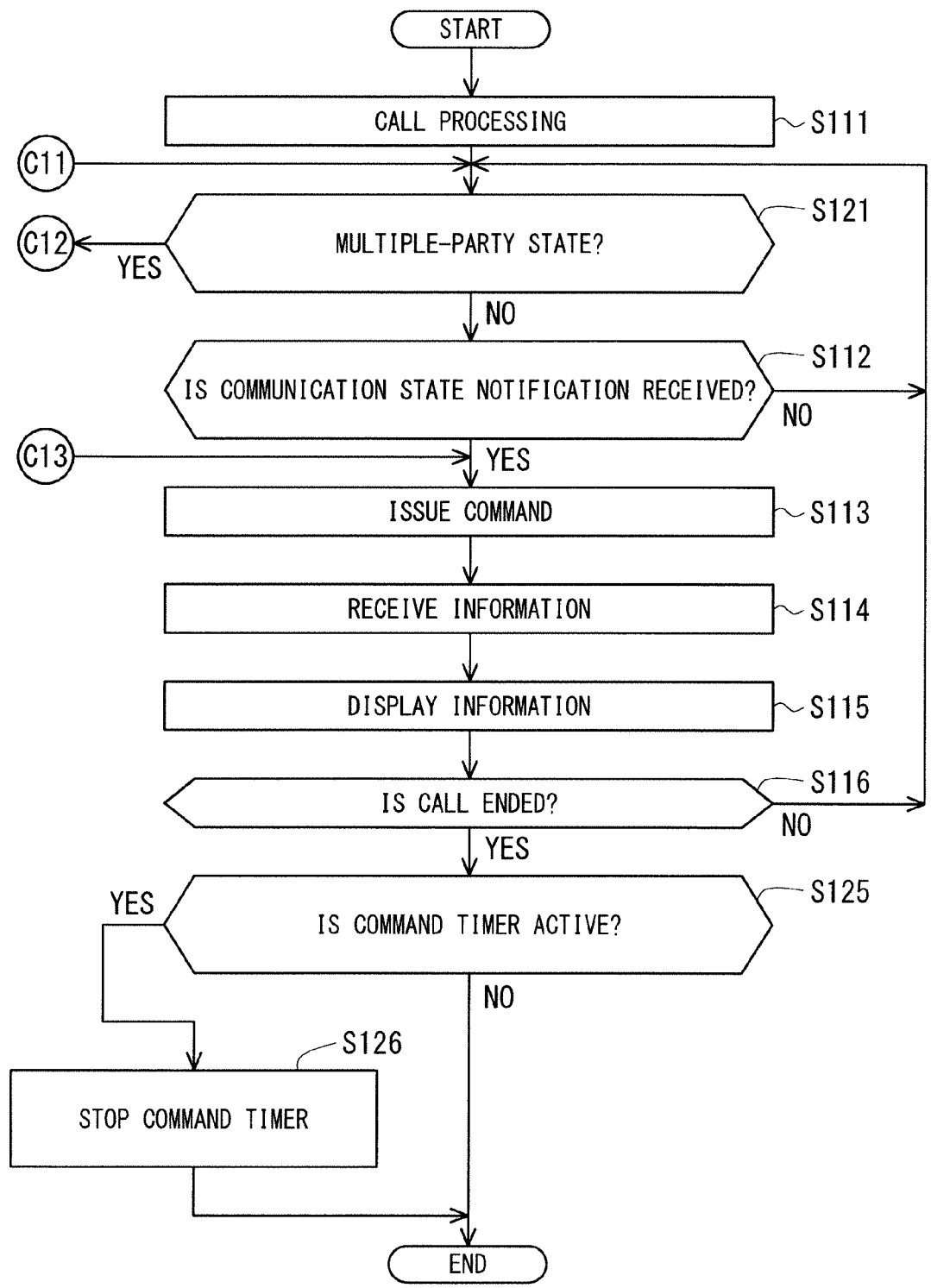
FIG. 8 is a flowchart showing an exemplary operation of the information terminal in accordance with the second preferred embodiment.
Figure 9:
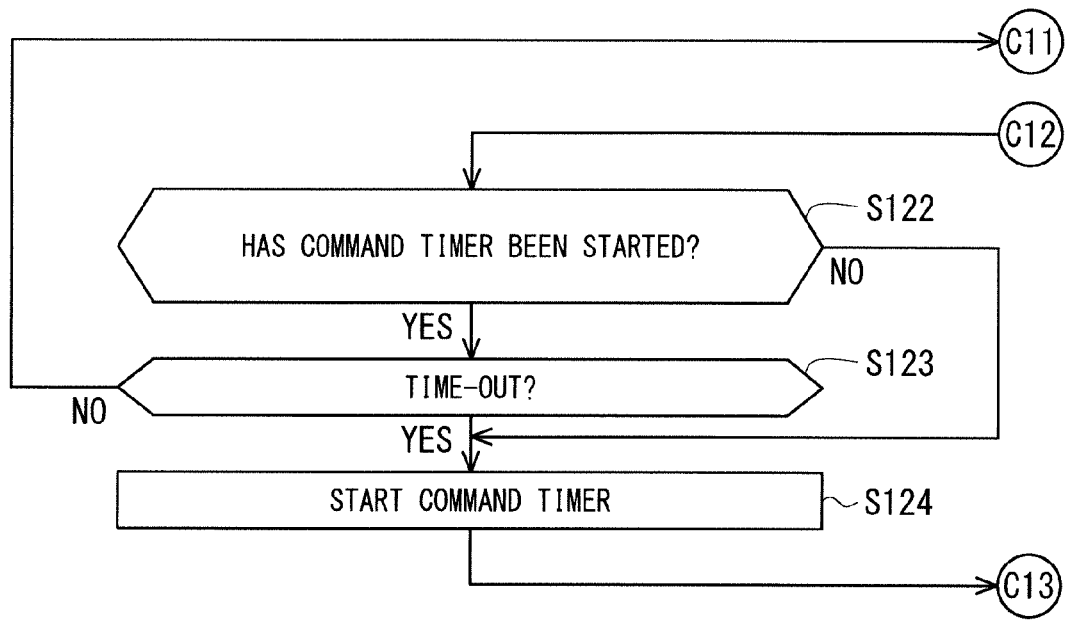
FIG. 9 is a flowchart showing an exemplary operation of the information terminal in accordance with the second preferred embodiment.

FIGS. 8 and 9 show flowcharts of an exemplary operation of the information terminal 1 in accordance with the second preferred embodiment. The flowcharts shown in FIGS. 8 and 9 are connected to each other with connectors C11, C12, and C13. In the flowcharts shown in FIGS. 8 and 9, Steps S121 to S126 are added to the flowchart of FIG. 5 described in the first preferred embodiment.

Specifically, after Step S111 for the call processing, the communication management unit 25 determines whether or not the multiple-party state S9 is formed (Step S121). The communication management unit 25 can make determination in Step S121, for example, by recording the start and the end of the multiple-party state S9 into the storage unit.

The start of the multiple-party state S9 can be determined by receiving the communication state notification indicating that the state is brought into the multiple-party state S9. Further, the end of the multiple-party state S9 can be determined by determining that the number of opposite-party devices 3 becomes one or less.

When it is determined in Step S121 that the multiple-party state S9 is not formed, the information terminal 1 determines whether or not the information terminal 1 receives the communication state notification (Step S112). When the information terminal 1 does not receive a new communication state notification, the information terminal 1 returns the process step to Step S112. On the other hand, when the information terminal 1 receives a new communication state notification, Step S113 is executed.

On the other hand, when it is determined in Step S121 that the multiple-party state S9 is formed, Steps S122 to S124 shown in FIG. 9 are executed. Specifically, the communication management unit 25 determines whether or not a timer (hereinafter, sometimes referred to as an information acquisition command timer or a command timer) for measuring the issue interval T1 of the information acquisition command has been started (Step S122). The command timer can be implemented by, for example, a timer function of the processor circuit which is a constituent element of the information processing unit 20.

When the command timer has not been started, the communication management unit 25 starts the command timer (Step S124), and after that, executes Step S113. On the other hand, when the command timer has been started, the communication management unit 25 determines whether or not the command timer times out (Step S123). When the command timer times out, the communication management unit 25 starts the command timer (Step S124), and after that, executes Step S113. On the other hand, when the command timer does not time out, the communication management unit 25 returns the process step to Step S121.

In Step S113 executed after the above Steps S112 and S124, the information acquisition command is issued like in the first preferred embodiment. After Step S113, Steps S114 to S116 are executed like in the first preferred embodiment.

As the result of determination in Step S116, when the call continues, the communication management unit 25 returns the process step to Step S121.

On the other hand, when the call is ended, the communication management unit 25 determines whether or not the command timer is active (Step S125). When the command timer is not active, the communication management unit 25 finishes the flow shown in FIGS. 8 and 9. On the other hand, when the command timer is active, the communication management unit 25 stops the command timer (Step S126) and then finishes the flow shown in FIGS. 8 and 9.

According to the second preferred embodiment, the issue of the information acquisition command is suppressed, as compared with the case where the periodic issue of the information acquisition command is always performed. Therefore, it is possible to suppress the consumption of the battery of the mobile device 2. As well as this effect, it is also possible to suppress a decrease in reliability of the communication management information, as compared with the case of depending only on the voluntary notification from the mobile device 2.

The Third Preferred Embodiment

Hereinafter, the third preferred embodiment will be described as to the issue of the information acquisition command. The constitution of the information terminal 1 and the information processing unit 20 is the same as that in the first preferred embodiment.

Figure 10:
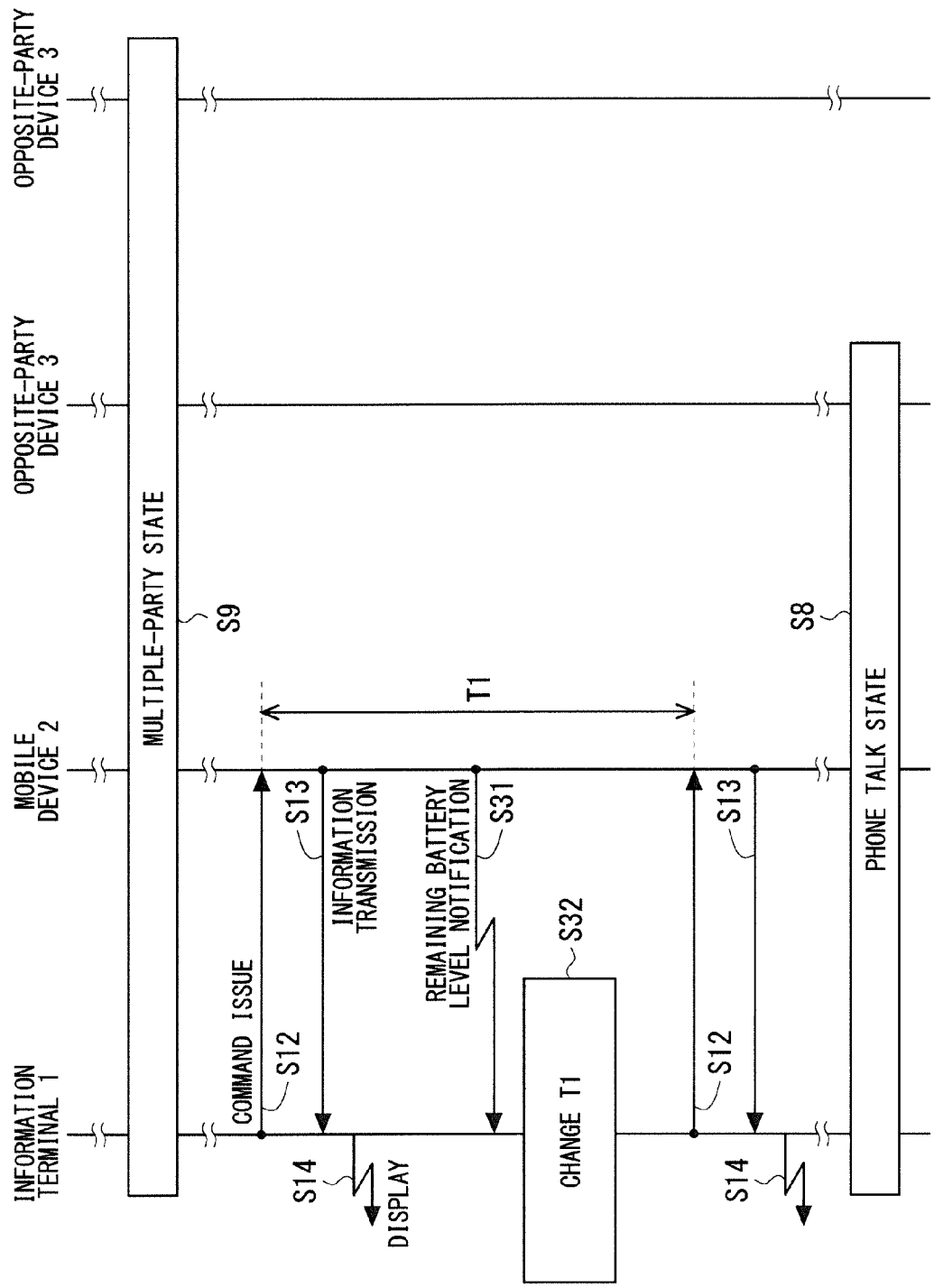
FIG. 10 is a sequence diagram showing an exemplary operation of the information terminal in accordance with a third preferred embodiment.

FIG. 10 shows a sequence diagram in accordance with the third preferred embodiment. In FIG. 10, due to the short of drawing space, the communication network 4 (see FIG. 4) is not shown. In the exemplary case of FIG. 10, like in the second preferred embodiment, the information acquisition command is intermittently issued in the multiple-party state S9. Unlike in the second preferred embodiment, however, the issue interval T1 of the information acquisition command is changed in accordance with the remaining battery level of the mobile device 2.

Specifically, when the remaining battery level reaches each of predetermined levels, the mobile device 2 voluntarily notifies the information terminal 1 of the remaining battery level (Step S31). Such a function for remaining battery level notification can be implemented by an already-known technique and is included in the standard of the Bluetooth (registered trademark).

When the information terminal 1 (more specifically, the communication management unit 25) receives the remaining battery level notification through the communication unit 11 and the communication control unit 21, the information terminal 1 changes the command issue interval T1 (Step S32). At that time, the command issue interval T1 is set so that the command issue interval T1 increases as the remaining battery level becomes lower.

Herein, it is assumed that the amount of change of the command issue interval T1 is a predetermined constant amount. As the remaining battery level, however, becomes lower, for example, the amount of change of the command issue interval T1 may be increased.

Figure 11:
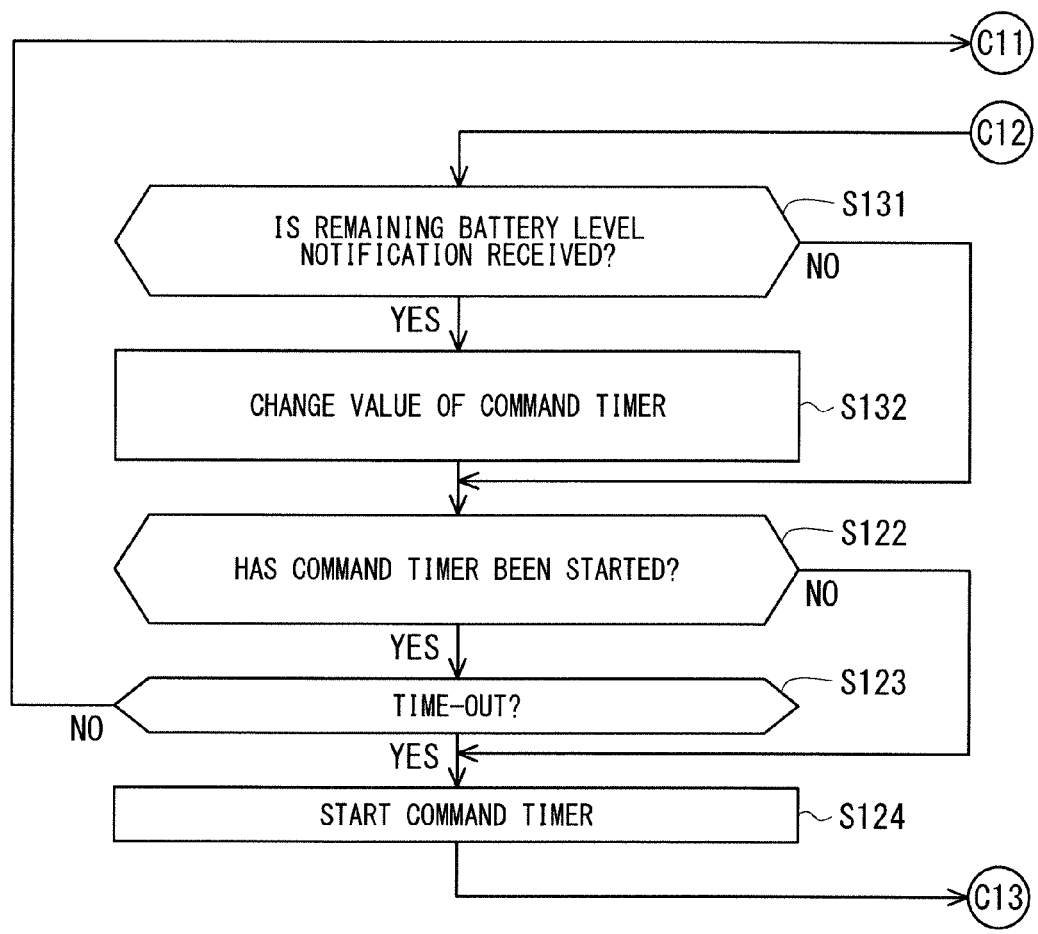
FIG. 11 is a flowchart showing an exemplary operation of the information terminal in accordance with the third preferred embodiment.

FIG. 11 shows a flowchart of an exemplary operation of the information terminal 1 in accordance with the third preferred embodiment. The flowchart shown in FIG. 11 is connected to the flowchart of the FIG. 8 described in the second preferred embodiment with the connectors C11, C12, and C13. In the flowchart shown in FIG. 11, Steps S131 and S132 are added to the flowchart of FIG. 9 described in the second preferred embodiment.

Specifically, when it is determined in Step S121 (see FIG. 8) that the multiple-party state S9 is formed, the communication management unit 25 determines whether or not the remaining battery level notification is received (Step S131). When a new remaining battery level notification is received, the communication management unit 25 changes a set value of the command timer in accordance with the remaining battery level (Step S132). The issue interval T1 of the information acquisition command is thereby changed. Step S132 corresponds to Step S32 described with reference to FIG. 10. After Step S132, the communication management unit 25 executes Step S122.

On the other hand, when it is determined in Step S131 that a new remaining battery level notification is not received, the communication management unit 25 executes Step S122 after Step S131.

According to the third preferred embodiment, the issue of the information acquisition command is suppressed, as compared with the case where the issue interval of the information acquisition command is constant. In particular, in the situation where the remaining battery level is lower, the issue of the information acquisition command is suppressed. Therefore, it is possible to suppress the consumption of the battery of the mobile device 2. As well as this effect, it is also possible to suppress a decrease in reliability of the communication management information, as compared with the case of depending only on the voluntary notification from the mobile device 2.

The case where the change of the issue interval T1 of the information acquisition command is performed in combination with the second preferred embodiment has been described above. The change of the command issue interval T1, however, can be adopted in various cases where the information acquisition command is issued intermittently. In a case, for example, where the information acquisition command is intermittently issued in the state where the mobile device 2 is connected to a single opposite-party device 3, the command issue interval T1 may be changed as above. Further, in a case where the information acquisition command is intermittently issued regardless of the number of opposite-party devices 3, the command issue interval T1 may be changed as above.

The Fourth Preferred Embodiment

Hereinafter, the fourth preferred embodiment will be described as to the issue of the information acquisition command. The constitution of the information terminal 1 and the information processing unit 20 is the same as that in the first preferred embodiment.

Figure 12:
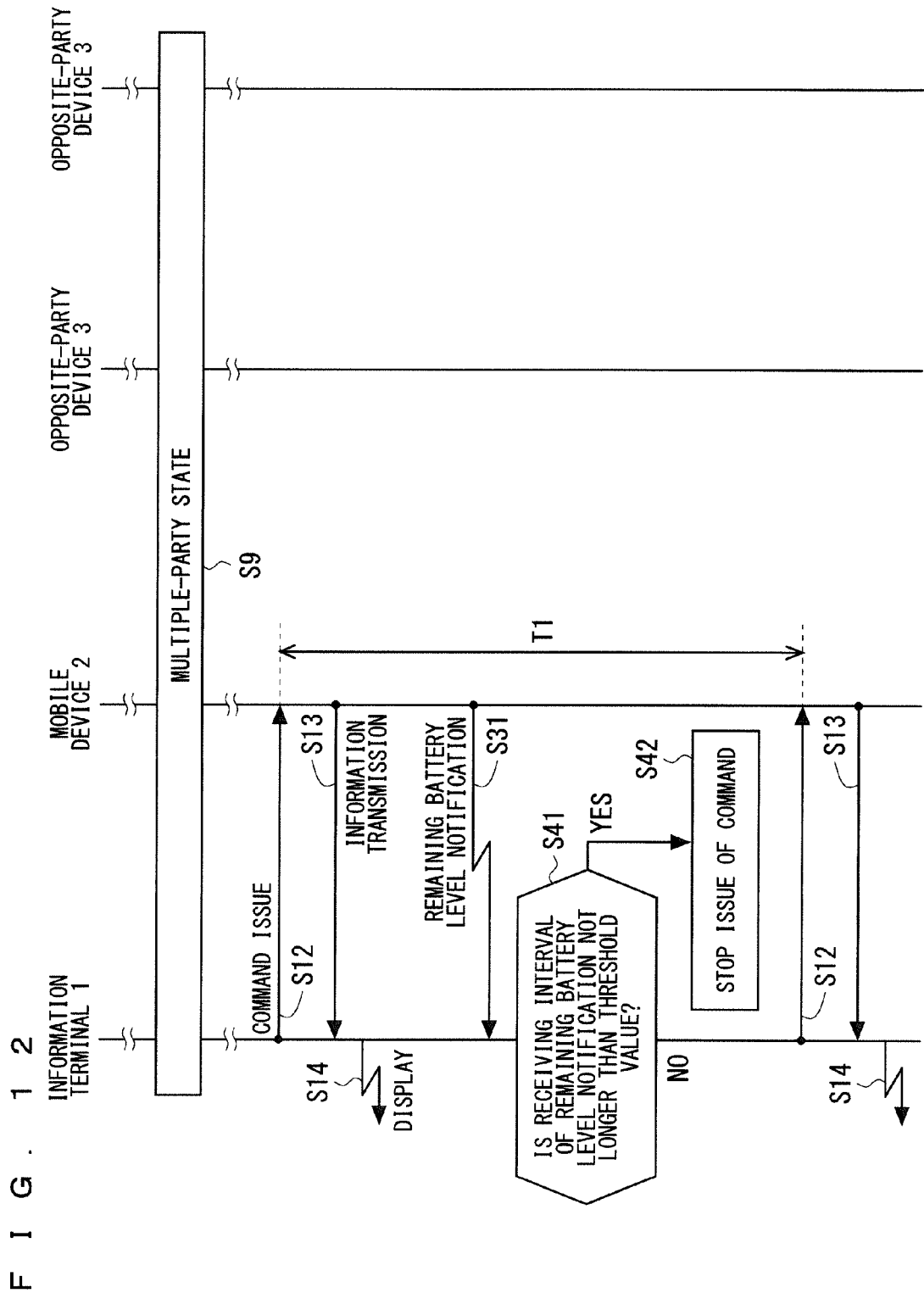
FIG. 12 is a sequence diagram showing an exemplary operation of the information terminal in accordance with a fourth preferred embodiment.

FIG. 12 shows a sequence diagram in accordance with the fourth preferred embodiment. In FIG. 12, due to the short of drawing space, the communication network 4 (see FIG. 4) is not shown. In the exemplary case of FIG. 12, when the information terminal 1 (more specifically, the communication management unit 25) receives the remaining battery level notification described in the third preferred embodiment (Step S31), the information terminal 1 compares a receiving interval of the remaining battery level notification with a predetermined threshold value (Step S41). As the result of comparison, when the receiving interval of the remaining battery level notification is not longer than the threshold value, the communication management unit 25 stops the issue of the information acquisition command since then (Step S42).

It is assumed that the above threshold value is stored in the storage unit in advance. Further, the receiving interval of the remaining battery level notification can be calculated by subtracting the previous receipt time from this receipt time. The previous receipt time is assumed to be recorded into the storage unit by the communication management unit 25. Further, it is assumed that calculation of the receiving interval is performed by the communication management unit 25.

Herein, in FIG. 12, shown is a case where stop of the issue of the information acquisition command occurs in the multiple-party state S9. The stop of the issue of the information acquisition command, however, can occur even in the state where the number of opposite-party devices 3 is one (see FIG. 4). In other words, Steps S41 and S42 can be adopted also in any one of the first to third preferred embodiments.

Figure 13:
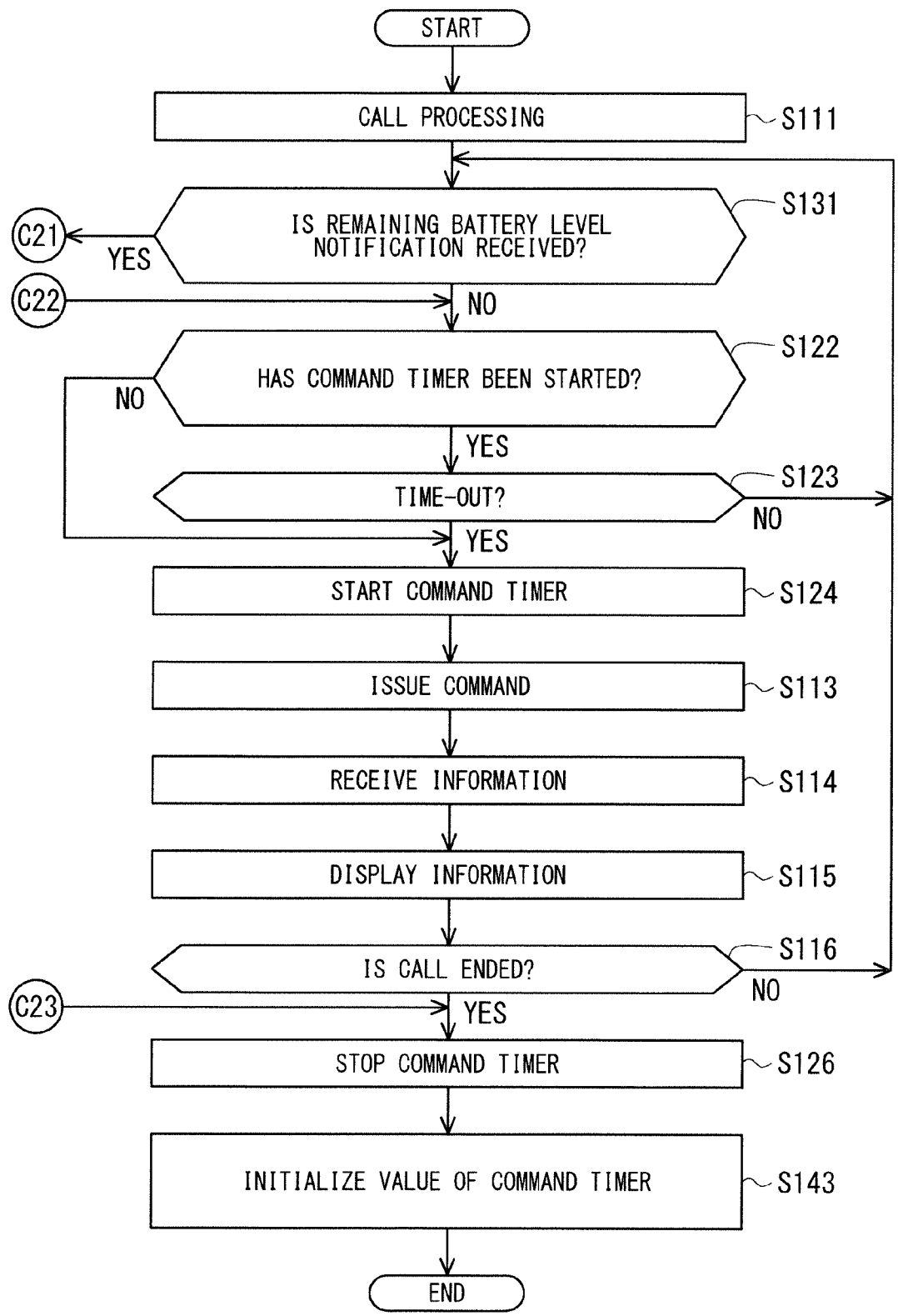
FIG. 13 is a flowchart showing an exemplary operation of the information terminal in accordance with the fourth preferred embodiment.
Figure 14:
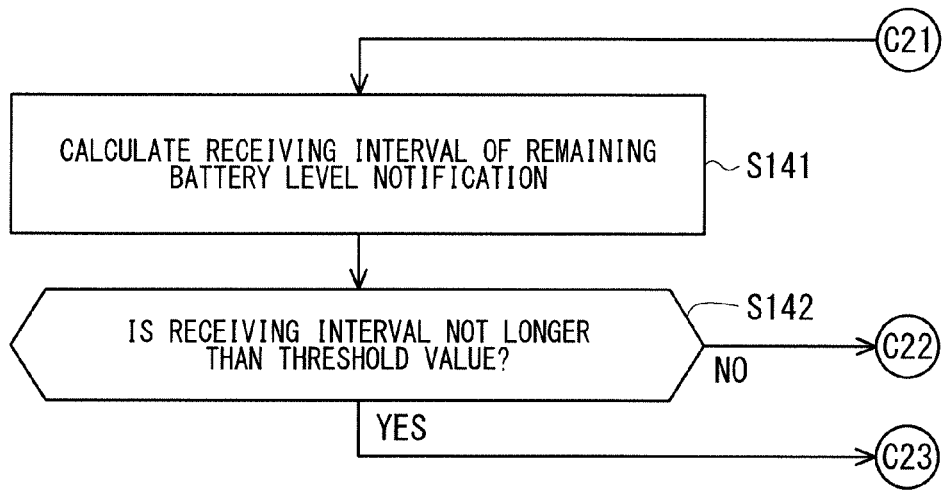
FIG. 14 is a flowchart showing an exemplary operation of the information terminal in accordance with the fourth preferred embodiment.

FIGS. 13 and 14 show flowcharts of an exemplary operation of the information terminal 1 in accordance with the fourth preferred embodiment. The flowcharts shown in FIGS. 13 and 14 are connected to each other with connectors C21, C22, and C23. In the flowcharts shown in FIGS. 13 and 14, the steps identical to those described in the first to third preferred embodiments are represented by the same reference signs.

In FIGS. 13 and 14, after Step S111 for the call processing, the communication management unit 25 determines whether or not the remaining battery level notification is received (Step S131). When a new remaining battery level notification is received, the communication management unit 25 calculates the receiving interval as to the remaining battery level notification of this time (Step S141). Then, the communication management unit 25 determines whether or not the calculated receiving interval is not longer than the predetermined threshold value (Step S142). A series of Steps S141 and S142 corresponds to Step S41 described with reference to FIG. 12.

As the result of determination in Step S142, when the receiving interval of the remaining battery level notification is not longer than the threshold value, the communication management unit 25 stops the command timer (Step S126). Step S126 corresponds to Step S42 described with reference to FIG. 12. After that, the communication management unit 25 initializes the value of the command timer (Step S143) and then finishes the flow shown in FIGS. 13 and 14.

On the other hand, when the communication management unit 25 determines in Step S142 that the receiving interval of the remaining battery level notification is longer than the threshold value and determines in Step S131 that a new remaining battery level notification is not received, Steps S122 to S124 described in the second preferred embodiment (see FIG. 9) are executed. When the command timer does not time out in Step S123, the communication management unit 25 returns the process step to Step S131.

After Step S124, Steps S113 to S116 described in the first preferred embodiment (see FIG. 5) are executed. When the call is not ended in Step S116, the communication management unit 25 returns the process step to Step S131. On the other hand, when the call is ended in Step S116, the above Steps S126 and S143 are executed.

According to the fourth preferred embodiment, the issue of the information acquisition command is suppressed, as compared with the case where the periodic issue of the information acquisition command is always performed. It is thought that the battery consumption is accelerated as the receiving interval of the remaining battery level notification becomes shorter. In such a case, in order to make the battery life last longer, it is desired to more suppress the power consumption. In consideration of this point, in the fourth preferred embodiment, the receiving interval of the remaining battery level notification is monitored, and on the basis of the monitoring result, the issue of the information acquisition command is stopped. It is thereby possible to more suppress the consumption of the battery of the mobile device 2.

Further, according to the fourth preferred embodiment, it is possible to suppress a decrease in reliability of the communication management information, as compared with the case of depending only on the voluntary notification from the mobile device 2, until the issue of the information acquisition command is stopped.

The Fifth Preferred Embodiment

Figure 15:
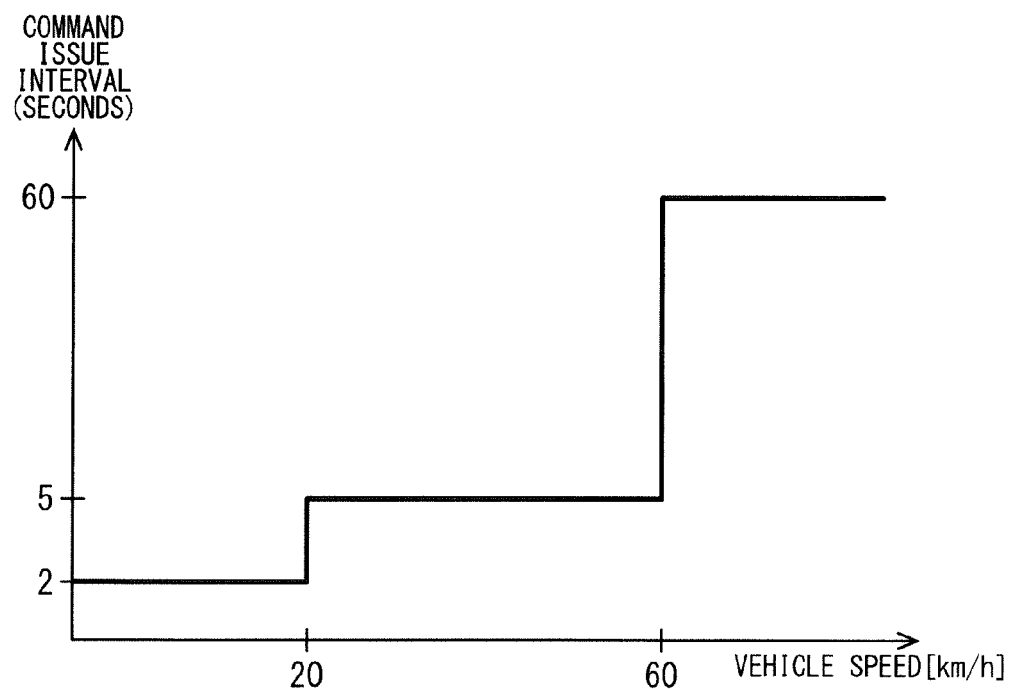
FIG. 15 is a conceptual diagram showing an exemplary operation of the information terminal in accordance with a fifth preferred embodiment.

FIG. 15 shows a conceptual diagram of the fifth preferred embodiment as to the issue of the information acquisition command. In the exemplary case of FIG. 15, the issue interval of the information acquisition command is changed in accordance with the speed of the car in which the information terminal 1 is arranged. Specifically, as the vehicle speed becomes higher, the command issue interval is set longer.

In the exemplary case of FIG. 15, the vehicle speeds are grouped into a plurality of speed ranges and a command issue interval is assigned to each of the speed ranges. The number of speed ranges, however, is not limited to the number shown in FIG. 15. Further, the numerical values shown in FIG. 15 are only examples.

Figure 16:
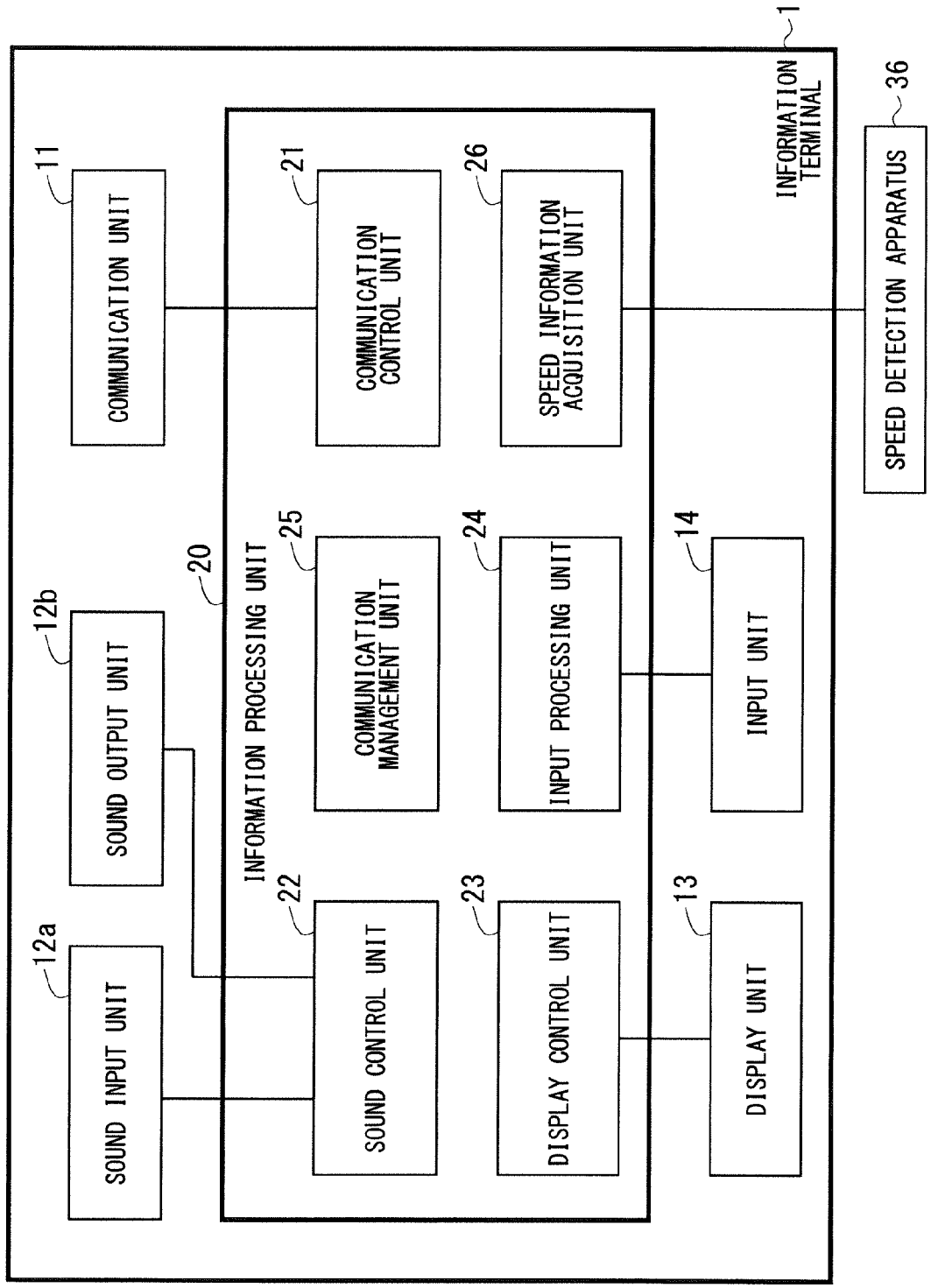
FIG. 16 is a block diagram showing an exemplary constitution of the information terminal in accordance with the fifth preferred embodiment.

FIG. 16 shows a block diagram of an exemplary constitution of the information terminal 1 in accordance with the fifth preferred embodiment. The exemplary use of the information terminal 1 (see FIGS. 1 and 2) is the same as that in the first preferred embodiment. In the exemplary case of FIG. 16, the information processing unit 20 has a constitution in which a speed information acquisition unit 26 is added to the constitution shown in FIG. 3. The speed information acquisition unit 26 may be added to the constitution shown in FIG. 6.

The speed information acquisition unit 26 acquires vehicle speed information detected by a speed detection apparatus 36. For example, the speed detection apparatus 36 transmits a vehicle speed value itself to the speed information acquisition unit 26. Alternatively, the speed information acquisition unit 26 may calculate the vehicle speed value on the basis of the information acquired from the speed detection apparatus 36.

The speed detection apparatus 36 is, for example, a speed sensor mounted on the car. Further, as the speed detection apparatus 36, a GPS (Global Positioning System) receiver mounted on the car can be applied. Specifically, the vehicle speed can be obtained from the change of a current position detected by the GPS receiver. Like these cases, when the speed detection apparatus 36 is mounted on the car, the speed information acquisition unit 26 can acquire the vehicle speed information from the speed detection apparatus 36 by using the in-vehicle communication system.

Further, the speed detection apparatus 36 may be a speed sensor set up on a road. In this case, the speed information acquisition unit 26 can acquire the vehicle speed information from the speed detection apparatus 36 via wireless communication.

FIG. 16 shows an exemplary case where the speed detection apparatus 36 is provided outside the information terminal 1. When the information terminal 1 has the GPS receiver, however, the GPS receiver can be used as the speed detection apparatus 36.

The communication management unit 25 acquires the vehicle speed value from the speed information acquisition unit 26, and sets the issue interval of the information acquisition command longer as the vehicle speed becomes higher. The relation between the vehicle speed and the command issue interval is given to the information processing unit 20 in advance. The relation is described, for example, as a conditional expression in the program. Alternatively, there may be a case where the relation is stored in the storage unit as data of table form in advance and the communication management unit 25 refers to the table.

Figure 17:
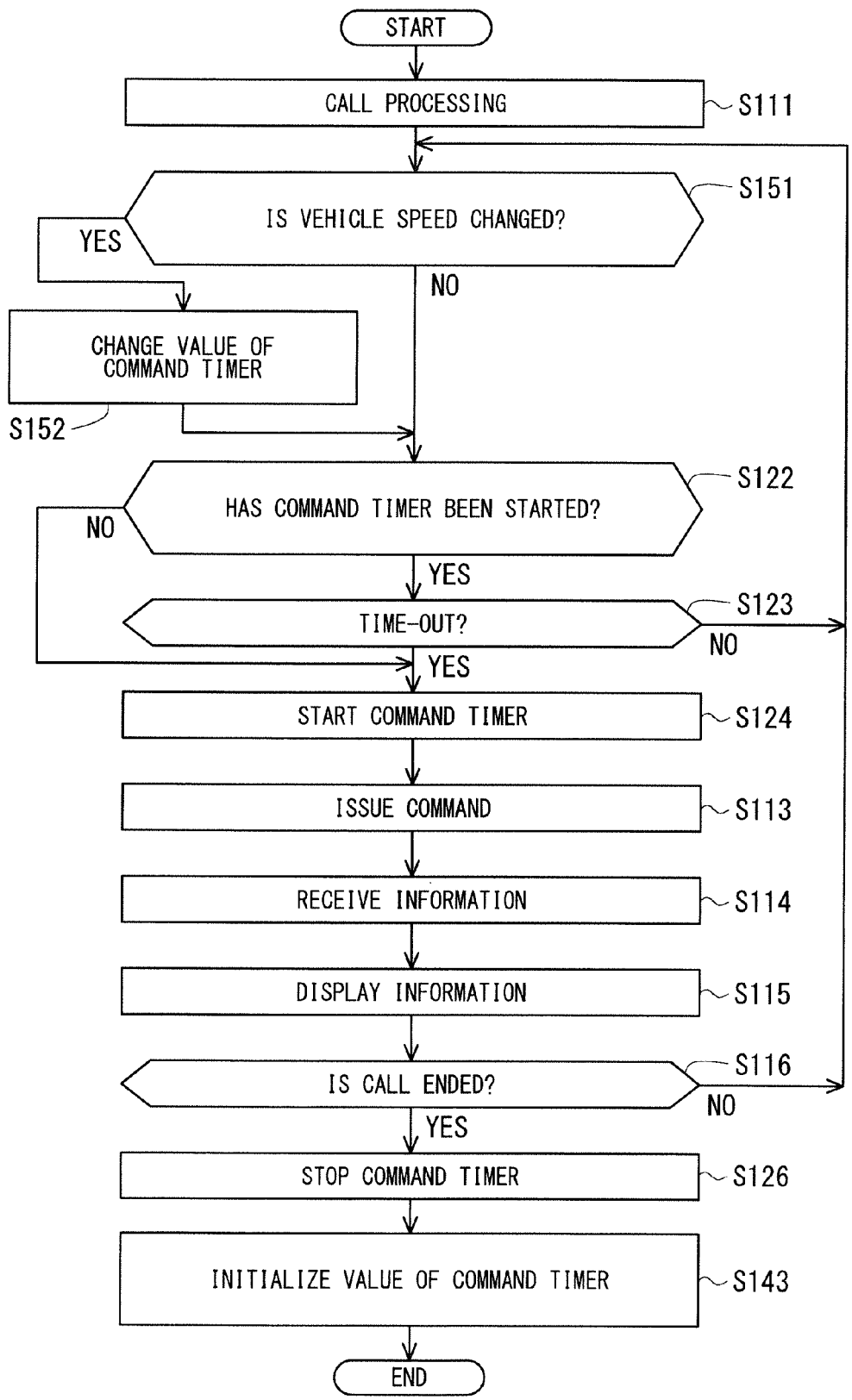
FIG. 17 is a flowchart showing an exemplary operation of the information terminal in accordance with the fifth preferred embodiment.

FIG. 17 shows a flowchart of an exemplary operation of the information terminal 1 in accordance with the fifth preferred embodiment. In the flowchart shown in FIG. 17, the steps identical to those described in the first to third preferred embodiments are represented by the same reference signs.

In FIG. 17, after Step S111 for the call processing, the communication management unit 25 determines whether or not the vehicle speed is changed (Step S151). For example, the communication management unit 25 determines whether or not a speed range (see FIG. 15) to which a current vehicle speed value belongs is the same as the speed range to which a vehicle speed value detected previously belongs. It is assumed that the vehicle speed value detected previously or the type of speed range to which the vehicle speed value detected previously belongs is recorded into the storage unit by the communication management unit 25.

When it is determined in Step S151 that the vehicle speed is changed, the communication management unit 25 changes the value of the command timer in accordance with the relation between the vehicle speed and the command issue interval which is given in advance (see FIG. 15) (Step S152).

After Step S152, like in the fourth preferred embodiment (see FIG. 13), Steps S122 to S124, S113 to S116, S126, and S143 are executed. When the command timer does not time out in Step S123 and the call is not ended in Step S116, however, the communication management unit 25 returns the process step to Step S151.

According to the fifth preferred embodiment, the issue of the information acquisition command is suppressed, as compared with the case where the issue interval of the information acquisition command is constant. In particular, in the situation where the vehicle speed is higher, the issue of the information acquisition command is suppressed. Therefore, it is possible to suppress the consumption of the battery of the mobile device 2. As well as this effect, it is also possible to suppress a decrease in reliability of the communication management information, as compared with the case of depending only on the voluntary notification from the mobile device 2.

Herein, it is thought that when the vehicle speed is high, since more attention is paid to driving, the chance that the driver watches the display screen decreases. In consideration of this point, even if the issue of the information acquisition command is suppressed when the vehicle speed is high, it is thought that the effect on the reliability of the communication management information is small.

The above technique for changing the issue interval of the information acquisition command in accordance with the vehicle speed can be adopted in various cases where the information acquisition command is intermittently issued. Therefore, the above technique can be combined with each of the second to fourth preferred embodiments. Further, the above technique may be adopted in the case, for example, where the mobile device 2 is connected to a single opposite-party device 3 and the information acquisition command is intermittently issued. Furthermore, the above technique can be adopted also in the case where the information acquisition command is intermittently issued, regardless of the number of opposite-party devices 3.

The Sixth Preferred Embodiment

The user may control the setting on whether to issue the information acquisition command. For example, the communication management unit 25 acquires a user instruction on whether to issue the information acquisition command through the input unit 14. At that time, the communication management unit 25 may instruct the display control unit 23 to display such an input screen as shown in FIG. 18.

Then, the communication management unit 25 controls the issue of the information acquisition command in accordance with the acquired user instruction. It is assumed that the user instruction is stored into the storage unit by the communication management unit 25.

When the issue of the information acquisition command is set "ON", the information terminal 1 controls the issue of the information acquisition command in accordance with various exemplary cases described in the first to fifth preferred embodiments.

According to the sixth preferred embodiment, the user can perform a control to suppress the consumption of the battery of the mobile device 2 and suppress a decrease in reliability of the communication management information. When the issue of the information acquisition command is set "ON" and the exemplary case of any one of the first to fifth preferred embodiments is adopted, for example, it is possible to suppress the consumption of the battery of the mobile device 2 and also suppress a decrease in reliability of the communication management information. On the other hand, when the issue of the information acquisition command is set "OFF", the use putting emphasis on suppression of the battery consumption can be selected.

<About Patent Documents 1 to 4>

Patent Documents 1 to 4 disclose techniques developed to suppress the battery consumption.

In Patent Document 1, an intermittent reception state of a cellular phone is controlled. Specifically, when the cellular phone receives an incoming call signal from a base station, the cellular phone itself sets an intermittent reception interval on the basis of a usage condition or the like of the cellular phone. Then, the intermittent reception interval which is set is notified from the cellular phone to the base station. The intermittent reception interval is set, for example, in accordance with the remaining battery level of the cellular phone. By using this technique, it is possible to make a sleep period of the intermittent reception longer and make an available time of the cellular phone longer when the remaining battery level becomes lower.

In Patent Document 2, power control of a communication function part of a communication terminal is made appropriate (power supply is stopped in an unused state). Specifically, whether or not there is data transmission and reception is monitored in an intermediate layer (for example, a driver layer) other than an application layer, and in accordance with the monitoring result, performed is power control of a communication unit (wireless communication unit) mounted on a physical layer. By using this technique, power consumption of the wireless communication unit becomes zero during a period while no data transmission and reception is performed and the battery life of the communication terminal becomes longer. Further, it is not necessary to add any improvement to various application programs mounted on the application layer.

In Patent Document 3, both power saving of a wireless communication device and stabilization of wireless communication between wireless communication devices are improved. Specifically, when the remaining battery level becomes lower or when there is no input from any one of a plurality of input apparatuses, the wireless communication device elongates the sniff interval in the communication with a communication party step by step. It is described that power saving can be thereby achieved. Further, when the communication is broken or when there is an input from any one of a plurality of input apparatuses, the sniff interval is shortened step by step. Stabilization of communication can be thereby ensured.

A sniff mode is one of power saving modes used by the Bluetooth (registered trademark). Normally, the sniff mode is used in a state where no transmission and reception of information is performed between application layers of the devices which are wireless connected to each other, and it is a technique for reducing consumption current by changing a packet transmission and reception interval on the radio.

Patent Document 4 discloses a system which automatically performs locking and unlocking of a door key of a vehicle and enables an engine to start via wireless communication between an in-vehicle apparatus and an electronic key. In some cases, the electronic key is mounted on a mobile phone.

The electronic key transmits a remaining level code indicating the remaining level of a battery mounted on itself to the in-vehicle apparatus. In an automatic control mode, the remaining level code is included in a response signal in responding to a response request signal transmitted from the in-vehicle apparatus. Further, in a manual control mode, the remaining level code is included in a control signal transmitted manually by a user.

When the remaining battery level indicated by the remaining level code is not higher than a predetermined value, the in-vehicle apparatus sets a transmission interval of the response request signal longer than a predetermined transmission interval. When the remaining battery level further decreases, the electronic key stops reception of the response request signal and transmission of the response signal. The automatic control mode which consumes the battery more than the manual control mode is thereby stopped. Further, the in-vehicle apparatus stops transmission of the response request signal.

The in-vehicle apparatus acquires the remaining level code by the above control signal while the automatic control mode is stopped, and when the remaining battery level indicated by the remaining level code is higher than the above predetermined value, the in-vehicle apparatus restarts transmission of the response request signal.

The techniques of Patent Documents 1 to 4, however, are different from the first to sixth preferred embodiments.

For example, the techniques of Patent Documents 1 to 4 do not deal with information which corresponds to the communication management information (information on the communication between the mobile device 2 and the opposite-party device 3). Therefore, the techniques of Patent Documents 1 to 4 do not have any function of acquiring and displaying the information which corresponds to the communication management information.

Further, the techniques of Patent Documents 1 to 3 suppress power consumption in the so-called physical layer. On the other hand, the first to sixth preferred embodiments suppress power consumption by an operation of the so-called application layer. Therefore, there is a difference in basic constitution.

Furthermore, in the technique of Patent Document 4, without any response request from the in-vehicle apparatus and manual operation of the user, the electronic key does not transmit the remaining level code of the battery to the in-vehicle apparatus. On the other hand, in the third to sixth preferred embodiment, the mobile device 2 voluntarily notifies the remaining battery level. Therefore, there is a difference in basic constitution.

<Common Variations of the First to Sixth Preferred Embodiments>

In the first to sixth preferred embodiments, exemplary cases have been described where the information terminal 1 is implemented with a head unit inside a car. Though the head unit is generally fixed in the car, the information terminal 1 may be arranged detachably.

Further, the information terminal 1 may be a mobile information terminal (hereinafter, sometimes referred to as a mobile terminal). Specifically, a mobile terminal may be carried in a car and used as the information terminal 1. As the mobile terminal, for example, a PDA (Personal Digital Assistance) such as a mobile phone, a smartphone, a tablet terminal, or the like may be used. Moreover, for example, an apparatus for specific use, such as a PND (Portable Navigation Device) or the like, may be used.

Furthermore, the information terminal 1 may be used inside a wheeled vehicle (for example, a rail vehicle) other than cars or may be used inside a moving object (for example, a plane or a ship) other than vehicles. In these exemplary cases, the information terminal 1 is movable together with a moving object such as a vehicle or the like.

Further, the use of the information terminal 1 is not limited to that inside a moving object. Specifically, when the information terminal 1 is a mobile terminal, the information terminal 1 is movable together with a person which is an example of the moving object.

Furthermore, the information terminal 1 may be a stationary type one.

In the present invention, the preferred embodiments may be freely combined, or may be changed or omitted as appropriate, without departing from the scope of the invention.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS 1 information terminal, 2 mobile device, 3 opposite-party device, 11 communication unit, 13 display unit, 20 information processing unit, 21 communication control unit, 25 communication management unit, 26 speed information acquisition unit, T1 issue interval of information acquisition command

The invention claimed is:

1. An information processing apparatus comprising: a communication controller to control communication with a mobile device, wherein said mobile device is driven by a battery and has a function of phone communication with another device, said information processing apparatus further comprising: a communication manager to acquire, through said communication controller, a voluntary notification given by said mobile device, to issue automatically, to said mobile device, an information acquisition command as a response to said voluntary notification when said voluntary notification indicates that a single-call state is formed by said mobile device, to thereby acquire information on communication between said mobile device and the other device, and to issue automatically and intermittently, to said mobile device, said information acquisition command when said voluntary notification indicates that the state of said mobile device is changed into a multiple-call state, to thereby acquire intermittently information on communication between said mobile device and other devices; and a display controller to cause a display apparatus to display information to be displayed, among communication management information acquired by said voluntary notification and said information acquisition command.

2. The information processing apparatus according to claim 1, wherein
said communication manager increases an issue interval of said information acquisition command as a remaining battery level notified voluntarily by said mobile device becomes lower.

3. The information processing apparatus according to claim 1, wherein
said communication manager stops issue of said information acquisition command when it is determined that an interval of receiving a remaining battery level notification notified voluntarily by said mobile device is not longer than a predetermined threshold value.

4. The information processing apparatus according to claim 1, wherein
said information processing apparatus is provided in an information terminal which is movable together with a moving object,
said information processing apparatus further comprising a speed information acquirer to acquire speed information of said moving object, and
said communication manager increases an issue interval of said information acquisition command as speed of said moving object becomes higher.

5. The information processing apparatus according to claim 1, wherein
said communication manager acquires a user instruction on whether to issue said information acquisition command automatically and controls automatic issue of said information acquisition command in accordance with said user instruction.

6. An information terminal comprising:
an information processor formed of said information processing apparatus as defined in claim 1; and
a communication circuit to perform communication with said mobile device under control of said communication controller.

7. An information processing method comprising receiving a voluntary notification given by a battery-powered mobile device having a function of phone communication with another device; issuing automatically, to said mobile device, an information acquisition command as a response to said voluntary notification when said voluntary notification indicates that a single-call state is formed by said mobile device, to thereby acquire information on communication between said mobile device and the other device; issuing automatically and intermittently, to said mobile device, said information acquisition command when said voluntary notification indicates that the state of said mobile device is changed into a multiple-call state, to thereby acquire intermittently information on communication between said mobile device and other devices; and causing a display apparatus to display information to be displayed, among communication management information acquired by said voluntary notification and said information acquisition command.

* * * * *